US009141693B2

(12) United States Patent
Ito et al.

(10) Patent No.: US 9,141,693 B2
(45) Date of Patent: Sep. 22, 2015

(54) WITHIN AN ELECTRONIC BOOK ENVIRONMENT, RETRIEVING AND DISPLAYING CONTENT ASSOCIATED WITH IMAGES OR TEXT IN THE ELECTRONIC BOOK

(75) Inventors: Akihiko Ito, Kanagawa (JP); Daisuke Kawamura, Tokyo (JP); Kazuhiro Fukuda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 13/264,394

(22) PCT Filed: Apr. 20, 2010

(86) PCT No.: PCT/JP2010/002851
§ 371 (c)(1),
(2), (4) Date: Oct. 14, 2011

(87) PCT Pub. No.: WO2010/125768
PCT Pub. Date: Nov. 4, 2010

(65) Prior Publication Data
US 2012/0036431 A1 Feb. 9, 2012

(30) Foreign Application Priority Data

May 1, 2009 (JP) ................................. 2009-112125

(51) Int. Cl.
*G06F 17/30* (2006.01)
*G06F 15/00* (2006.01)
*G06F 17/22* (2006.01)

(52) U.S. Cl.
CPC .......... *G06F 17/30722* (2013.01); *G06F 15/00* (2013.01); *G06F 17/2235* (2013.01); *G06F 17/30056* (2013.01)

(58) Field of Classification Search
CPC ....................................................... G06F 15/00
USPC ........................................................... 715/273
See application file for complete search history.

(56) References Cited

U.S. PATENT DOCUMENTS 7,165,217 B1  1/2007 Kondo
8,051,385 B1 * 11/2011 Yawitz et al. ................. 715/776
(Continued)

FOREIGN PATENT DOCUMENTS

CN    1306261 A     8/2001
JP    10-143522    5/1998
(Continued)

OTHER PUBLICATIONS

Crestani, F., et al., "Appearance and functionality of electronic books," International Journal on Digital Libraries, vol. 6, No. 2, pp. 192-209, (Mar. 8, 2005).
(Continued)

*Primary Examiner* — Laurie Ries
*Assistant Examiner* — Tionna Burke
(74) *Attorney, Agent, or Firm* — Oblon, McClelland, Maier & Neustadt, L.L.P.

(57) ABSTRACT

[Object] To lead a user to various types of information easily with an electronic book as a starting point. [Solving Means] A server apparatus includes a storage, a communication section, and a controller. The storage stores an electronic book obtained by digitizing a book having at least one page in which at least one information item is represented, and associated information that is associated with the information item. The communication section communicates with an external electronic apparatus. The controller generates, when the electronic book is displayed by the external electronic apparatus and the information item of the electronic book is designated, an electronic book unit by adding first metadata to the information item so that display processing of the associated information is executed on the external electronic apparatus, and controls the communication section to transmit the generated electronic book unit to the external electronic apparatus.

20 Claims, 16 Drawing Sheets

(56) References Cited

U.S. PATENT DOCUMENTS

| | | |
|---|---|---|
| 2001/0007980 A1* | 7/2001 | Ishibashi et al. ................ 705/26 |
| 2002/0138520 A1* | 9/2002 | Wakai et al. .................. 707/517 |
| 2008/0222552 A1* | 9/2008 | Batarseh et al. ............. 715/776 |
| 2009/0112685 A1* | 4/2009 | Tunguz-Zawislak et al. .. 705/10 |
| 2010/0262490 A1 | 10/2010 | Ito et al. |
| 2011/0145733 A1* | 6/2011 | Neitz et al. .................... 715/761 |
| 2013/0024470 A1* | 1/2013 | Gerwin ......................... 707/769 |

FOREIGN PATENT DOCUMENTS

| | | |
|---|---|---|
| JP | 2001-195412 | 7/2001 |
| JP | 2002-183207 A | 6/2002 |
| JP | 2003-067418 A | 3/2003 |
| JP | 2003-233726 | 8/2003 |
| JP | 2006-023860 A | 1/2006 |
| JP | 2007-279901 | 10/2007 |
| JP | 2001 5816 | 1/2011 |

OTHER PUBLICATIONS

International Search Report Issued Nov. 2, 2011 in PCT/JP10/02851 Filed Apr. 20, 2010.

Office Action issued Jul. 8, 2014 in Japanese Patent Application No. 2009-112125.

Combined Chinese Office Action and Search Report issued Jun. 24, 2013, in Chinese Patent Application No. 201080018097.9 with English translation.

Office Action issued Feb. 18, 2014 in Japanese patent Application No. 2009-112125.

Office Action issued Oct. 16, 2014 in Japanese Patent Application No. 2009-112125.

* cited by examiner

FIG.10A
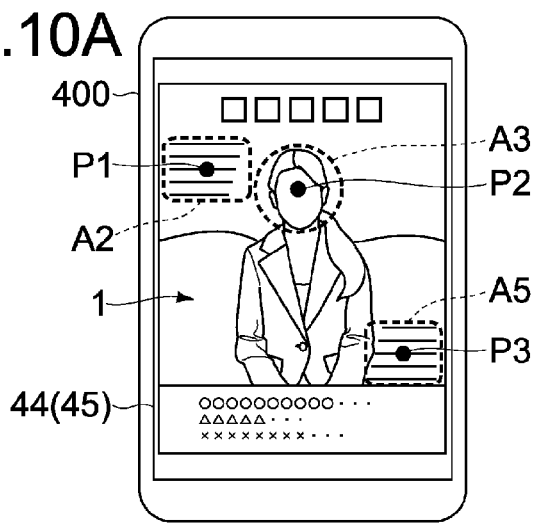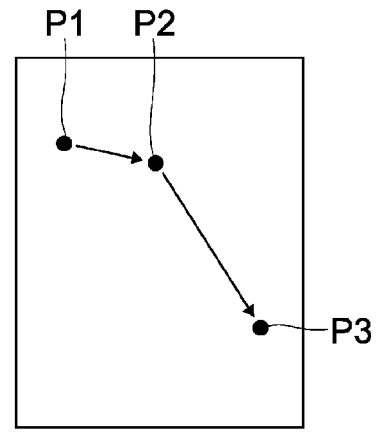
FIG.10B
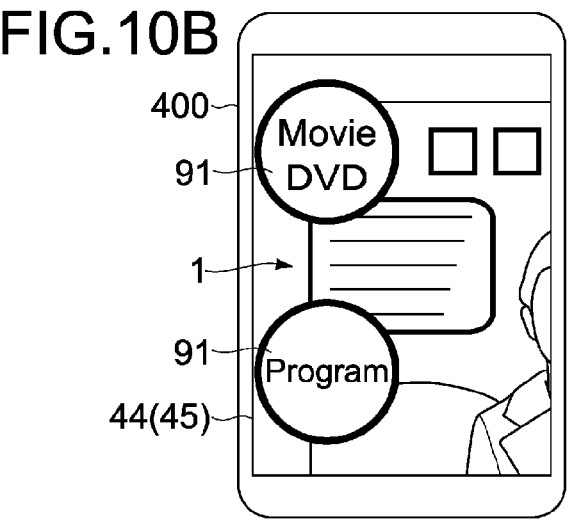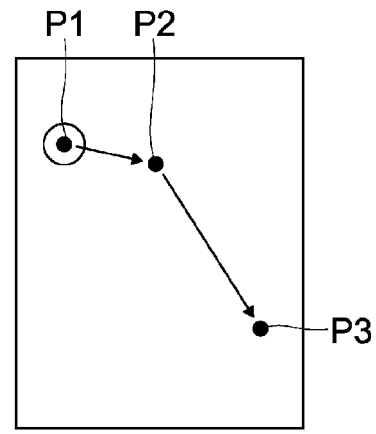
FIG.10C
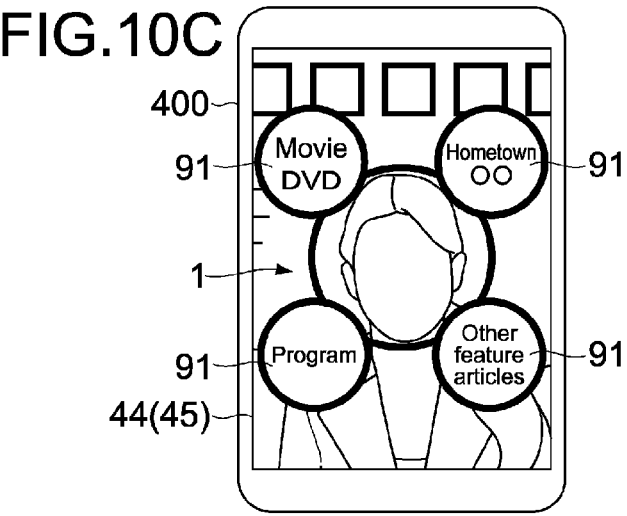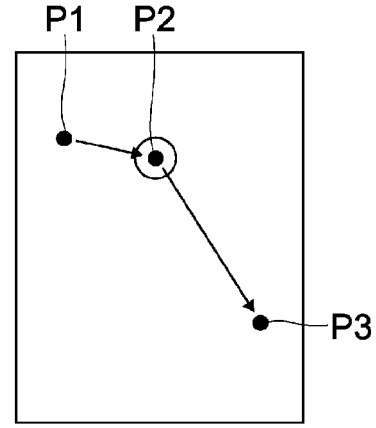

WITHIN AN ELECTRONIC BOOK ENVIRONMENT, RETRIEVING AND DISPLAYING CONTENT ASSOCIATED WITH IMAGES OR TEXT IN THE ELECTRONIC BOOK

TECHNICAL FIELD

The present invention relates to a server apparatus that provides information of an electronic book or the like to an electronic apparatus as a client, an electronic apparatus that displays the information of an electronic book or the like, an electronic book providing system, an electronic book providing method, an electronic book displaying method, and a program.

BACKGROUND ART

From the past, there are electronic books (digital books) in which books such as printed magazines published by publishers are digitized to enable them to be browsed in electronic apparatuses such as PCs (Personal Computers) and cellular phones. The electronic books have a merit that publishers can provide contents of the books to readers at lower costs than in the case of providing printed publications, and are therefore prevailing increasingly.

When browsing such an electronic book on a display apparatus, for example, a user can turn a page or add a bookmark by performing various operations on the electronic book displayed on the display apparatus. For example, Patent Document 1 below discloses an electronic book display apparatus capable of putting, when an arbitrary element out of a plurality of elements constituting contents of a book is designated via an input means, a mark for emphasizing the designated element in accordance with a designated position in an area displaying the designated element.

CITATION LIST

Patent Literature

[Patent Document 1] Japanese Patent Application Laid-open No. 2001-05816

SUMMARY OF INVENTION

By adding the page-turn function or bookmark function as described above, it is possible to improve operability on the electronic book. However, those additional functions merely enable operations that have been made by the user when he/she reads a printed book to be also performed on the electronic book, and the user cannot necessarily enjoy functions that are impossible to be performed on printed books.

On the other hand, though electronic books include a large amount of information that can lead a user to other information, such as image information and letter information, it is not easy to lead a user to other information by merely allowing users to browse electronic books.

In view of the circumstances as described above, it is desirable to provide a server apparatus, an electronic apparatus, an electronic book providing system, an electronic book providing method, an electronic book displaying method, and a program that are capable of leading a user to various types of information with an electronic book as a starting point.

According to an embodiment of the present invention, there is provided a server apparatus including a storage, a communication section, and a controller. The storage stores an electronic book obtained by digitizing a book having at least one page in which at least one information item is represented, and associated information that is associated with the information item. The communication section communicates with an external electronic apparatus. The controller generates, when the electronic book is displayed by the external electronic apparatus and the information item of the electronic book is designated, an electronic book unit by adding first metadata to the information item so that display processing of the associated information is executed on the external electronic apparatus. Further, the controller controls the communication section to transmit the generated electronic book unit to the external electronic apparatus.

With this structure, by adding the first metadata to the information item of the electronic book and transmitting the resultant to the electronic apparatus as the electronic book unit, the server apparatus can prompt a user of the electronic apparatus to browse not only the electronic book itself, but also various types of associated information with the electronic book as a starting point.

Here, the electronic book refers to books obtained by digitizing various kinds of books such as a magazine, a novel, a comic, a dictionary, a thesaurus, a picture book, a photo book, a poetry book, an art collection book, a technical book, a map, and a brochure. Further, those obtained by digitizing printed media such as a leaflet and a card are also included in the electronic book. The information item refers to image information such as a photo, a drawing, and an illustration of a person, a character, a product, etc., and letter information such as an article and a text.

For example, in a case where the information item is an image of a person or a character, the associated information is information on a program, a movie, and a game in which that person or character appears, product information of a DVD, a BD (Blu-ray Disc), a book, a music piece, or sundry goods associated with that person or character, a profile of that person or character, etc. In a case where the information item is a product image of clothes or food, for example, the associated information is detailed information of those products, information used for purchasing those products, etc. In a case where the information item is an image of a specific location or facility (shop etc.), the associated information is information such as map information and shop information of the location or facility. In a case where the information item is letter information such as an article and a text, the associated information is a product and a service (program etc.) retrieved by the letter information, other articles or texts including contents similar to the letter information, and the like. Moreover, the associated information may be contents themselves such as a moving image, a still image, and a music piece associated with the information item. As the associated information, an article, a text, or the like of another electronic book (electronic book unit) including information on the information item may be displayed. For example, in a case where the information item is an image of a person, a feature article of the same person that appears in another electronic book may be displayed. Further, in a case where the electronic book is a picture book of plants and information on trees (image and text) is presented as the information item, information on insects that inhabit the trees may be extracted as the associated information from a picture book of insects as another electronic book in association with the information on trees. The external electronic apparatus is a PC, a cellular phone, a smartphone, a PDA (Personal Digital Assistant), an electronic dictionary, and other AV (Audio/Visual) apparatuses, for example.

The communication section may receive designation information that indicates designation of the information item from the external electronic apparatus. In this case, the controller may extract the associated information from the storage based on the first metadata corresponding to the designated information item that is indicated by the received designation information. Further, the controller may control the communication section to transmit the extracted associated information to the external electronic apparatus.

Accordingly, by transmitting the associated information that is updated as needed like program information and the like to the electronic apparatus in accordance with the designation of the information item that is made on the electronic apparatus, the server apparatus can constantly provide real-time associated information to the user with the electronic book as a starting point.

The information item may exist plurally in one page of the electronic book. In this case, the controller may add the first metadata to each of points at which out of the plurality of information items, a first information item and a second information item that have a predetermined association are represented, so that a display area of the electronic book unit is movable with the points as a reference in the external electronic apparatus.

Accordingly, by adding the metadata to the points of the information items, the server apparatus can sequentially display only the information items having an association out of the plurality of information items on the electronic apparatus side. In other words, the server apparatus can set the metadata as a reference of a viewpoint movement of a user of the electronic apparatus, and thus provide only the information items in which the user is interested by filtering them, for example.

Here, the predetermined association refers to an association in themes, persons, importance, etc. A predetermined position refers to the center of each information item, for example, but is not limited thereto.

The electronic book may include a plurality of page groups each including at least one page. In this case, the controller may add second metadata indicating information on a page group to the electronic book so that when a first operation is input in the external electronic apparatus, a page displayed in the electronic book unit moves to a next page to be displayed, and when a second operation is input in the external electronic apparatus, the page displayed in the electronic book unit moves to another page of a page group that is different from a page group to which the page belongs, and is then displayed.

The page group refers to a unit for collectively managing a series of or a plurality of associated pages in a single feature article, column, chapter, and the like. The first operation and the second operation are distinguished by a direction indicated by a trail of a finger of the user or the like in a case where the electronic apparatus includes a touch panel or a touch pad, for example.

Accordingly, in a case where the user is not interested in contents of a certain page group, the server apparatus can skip the page group and display another page group instead of sequentially turning the plurality of pages for display. As a result, the server apparatus can lead the user to the associated information with the information item of a page belonging to the page group in which the user is interested being used as a starting point.

The second operation may include a third operation and a fourth operation. In this case, the storage may store a plurality of electronic books, a plurality of pieces of first metadata, and a plurality of pieces of second metadata in association with each other. In this case, the controller may generate the electronic book unit so that when the third operation is input in the electronic apparatus, the page displayed in the electronic book unit moves to a first page of a page group subsequent to a page group to which the page belongs and is then displayed, and when the fourth operation is input in the electronic apparatus, the page displayed in the electronic book unit moves to a first page of another page group associated with the first metadata added to the information item of the displayed page and is then displayed.

Accordingly, the server apparatus can not only display the electronic book unit in a page group unit, but also display the page group including contents in which the user is interested in accordance with the operation of the user of the electronic apparatus. Here, the third operation is an operation that indicates that the user is not interested in a displayed page, and the fourth operation is an operation that indicates that the user is interested in the displayed page, for example.

The electronic book may include a plurality of pages. In this case, the storage may store a plurality of pairs of the electronic book and the first metadata in association with each other. In this case, the controller may add the first metadata to each of the information items in the plurality of pages of the plurality of electronic books, and generate the electronic book unit so that the plurality of pages of the plurality of electronic books are displayed in an order based on a predetermined rule at predetermined time intervals, irrespective of an order of the plurality of pages.

Accordingly, since the server apparatus can display the pages of the plurality of electronic books in the order that is based on the predetermined rule, it is possible to save user's time and effort of turning the pages for browsing the plurality of electronic books that have been necessary in the past.

Here, the order that is based on the predetermined rule may be set to be random, or may be an order sorted in accordance with contents of the pages, such as a category and a genre. In addition, the display order may be changed at random on a page group unit instead of the page unit. For example, in a case where a column A (total of 5 pages), a column B (total of 8 pages), and a column C (total of 3 pages) are included as page groups in this order in a certain electronic book, the display order may be changed to an order like the column A, the column C, and the column B.

According to another embodiment of the present invention, there is provided an electronic apparatus including a storage, a display, a detector, and a controller. The storage stores an electronic book unit including an electronic book obtained by digitizing a book having at least one page in which at least one information item is represented and first metadata that is set for the information item. The display displays the electronic book unit. The detector detects an operation of designating the information item, the operation being made by a user on the displayed electronic book unit. The controller controls the display to display, when the operation of designating the information item is detected, associated information that is associated with the information item based on the first metadata set for the information item.

With this structure, by displaying the electronic book unit in which the metadata is set for the information item of the electronic book and detecting the designation of the information item by the user, the electronic apparatus can prompt a user to browse not only the electronic book, but also various types of associated information with the electronic book as a starting point. The associated information may be information embedded in the electronic book unit or information received from an external apparatus at a time of the detection of the above designation operation.

The information item may exist plurally in one page of the electronic book. In this case, the display may include a predetermined display area. In this case, the first metadata may be added to each of points at which out of the plurality of information items of the electronic book unit, a first information item and a second information item that have a predetermined association are represented. In this case, the controller may control the display so that one of the first information item and the second information item is displayed with each of the points as a center of the display area, and the first information item and the second information item out of the plurality of information items are successively displayed with the points as a reference.

Accordingly, the electronic apparatus can cause the user to browse the information items reliably even in a case where the display area of the display is smaller than a display area of one page of the electronic book unit, for example. Moreover, since the information items are associated by the first metadata added to the points, the electronic apparatus can display only information items in which the user is interested by filtering them, for example. Accordingly, the electronic apparatus can lead the user to various types of associated information with the information items in which the user is interested as a starting point.

The electronic book may include a plurality of page groups each including at least one page. In this case, the electronic book unit may be added with second metadata indicating information on the page groups. In this case, the controller may control, based on the second metadata, the display so that when a first operation of a user is detected by the detector, a page displayed in the electronic book unit moves to a next page to be displayed, and when a second operation of the user is detected by the detector, the page displayed in the electronic book unit moves to another page of a page group that is different from a page group to which the page belongs, and is then displayed.

Accordingly, in a case where the user is not interested in contents of a certain page group, the electronic apparatus can skip the page group and display another page group instead of sequentially turning the plurality of pages for display. As a result, the electronic apparatus can lead the user to the associated information with the information item of a page belonging to the page group in which the user is interested being used as a starting point.

The second operation may include a third operation and a fourth operation. In this case, the storage may plurally store the electronic book unit including the first metadata and the second metadata. In this case, the controller may control the display so that when the third operation is input in the electronic apparatus, the page displayed in the electronic book unit moves to a first page of a page group subsequent to the page group to which the page belongs, and is then displayed. Further, when the fourth operation is input in the electronic apparatus, the controller may control the display so that the page displayed in the electronic book unit moves to a first page of one of another page group of the electronic book unit and a page group of another electronic book unit stored in the storage, the page groups being associated with the first metadata added to the information item of the displayed page, and is then displayed. Accordingly, the electronic apparatus can not only display the electronic book unit in a page group unit, but also display the page group including contents in which the user is interested in accordance with the operation of the user.

The electronic apparatus may further include a communication section to communicate with an external server apparatus. In this case, when another page group associated with the first metadata does not exist in the electronic book and a page group of another electronic book unit associated with the first metadata does not exist in a case where the fourth operation is input, the controller may control the communication section to receive a page group of another electronic book unit stored in the server apparatus, the page group being associated with the first metadata, and control the display so that the displayed page moves to a first page of the received page group and is then displayed.

Accordingly, by cooperating with the server apparatus, the electronic apparatus can display a page of an electronic book that does not exist in the electronic apparatus and lead the user to a larger number of associated information.

The electronic book may include a plurality of pages. In this case, the storage may store condition information of a case where the plurality of pages of the electronic book unit are displayed as a list. In this case, the controller may control the display to display the plurality of pages as a list so that out of the plurality of pages of the electronic book unit, a page matching the condition information is distinguishable from the other pages.

Accordingly, the user can easily browse the pages while distinguishing them in accordance with the condition information. The condition information refers to a display history of each page, designation information of a theme of each page, or the like. In a case where the condition information is a display history, the electronic apparatus can change a display area or an order of display of pages in accordance with the number of display times and a display time period. In a case where the condition information is designation information of a theme, the electronic apparatus can change the display area or the order of display of pages in accordance with a similarity with respect to the designated theme. Accordingly, the user can easily find a page that the user has browsed in the past and wishes to browse again, or pick up and browse only a page in which the user is interested.

The storage may plurally store the electronic book unit and a display history of the page of the electronic book unit. In this case, the controller may generate a bookshelf image so that book images respectively indicating the plurality of electronic book units are arranged to be selectable by the user based on the display histories, and out of the pages of the electronic book units, pages that have been displayed and the other pages that have not been displayed are visually distinguishable within the book images. Then, the controller may control the display to display the bookshelf image.

Accordingly, the electronic apparatus can not only display the electronic book units stored in the storage as books in a bookshelf, but also express which pages in each book image have been displayed, as a bookshelf image. Accordingly, the user can visually recognize whether the pages of the electronic book units have been browsed at once, with the result that the browsing operation thereafter can progress efficiently. The display history may be stored in an external server apparatus, and the electronic apparatus may generate a bookshelf image based on the display history received from the server apparatus. Further, the bookshelf image generated by the server apparatus may be received by the electronic apparatus to be displayed.

Each of the plurality of electronic book units may be added with second metadata indicating an attribute of each of the pages of the electronic book units. In this case, the controller may generate the bookshelf image so that the attribute of the page that has been displayed is visually distinguishable within the book images in the bookshelf image based on the second metadata.

Accordingly, the user can easily recognize not only as to whether the pages of the electronic book units have been browsed, but also what types of attributes are included in the pages that have been browsed. Here, the attribute refers to a genre, a category, or the like of contents of each page.

The display history may include date and time information on a date and time on/at which each page has been displayed. In this case, the controller may generate the bookshelf image so that the book images are sequentially arranged and displayed in accordance with the date and time information.

Accordingly, by browsing the bookshelf images, the user can grasp a transition of his/her own reading trend at different ages. Here, the date and time information may indicate a date and time on/at which each page has been displayed for the first time or displayed for the last time, or a date and time therebetween.

Each of the plurality of electronic book units may be added with second metadata indicating location information on a location associated with each of the electronic book units. In this case, the storage may store map information of a predetermined area. In this case, the controller may generate the bookshelf image so that the book images are arranged in accordance with the second metadata on the map information. Accordingly, the user can easily recognize a relationship between the electronic book unit possessed by him/herself and the location, and perform browse in accordance with the location.

The electronic apparatus may further include a communication section to communicate with an external server apparatus. In this case, the controller may control the communication section to transmit information on the plurality of electronic book units stored in the storage to the external server apparatus and receive, from the external server apparatus, another electronic book unit associated with the plurality of stored electronic book units. Further, the controller may update the bookshelf image so that a book image indicating the received electronic book unit is arranged to be distinguishable from the book images included in the displayed bookshelf image.

Accordingly, the electronic apparatus can recommend the electronic book unit by adding the electronic book unit that is newly received from the server apparatus to the bookshelf image. Here, the "information on the plurality of electronic book units stored in the storage" may be a list of the plurality of electronic book units or may be user's preference information analyzed from the list.

The electronic apparatus may further include a communication section to communicate with an external electronic apparatus. In this case, the controller may control the communication section to perform one of a reception of a bookshelf image of an electronic book unit stored in the external electronic apparatus from the external electronic apparatus, and a transmission of the bookshelf image of the plurality of electronic book units stored in the storage to the external electronic apparatus. Then, the controller may control the display to display the received bookshelf image.

Accordingly, by sharing a bookshelf image of a user of another electronic apparatus as well, the user can browse more electronic book units and a larger number of associated information with the electronic book units as a starting point. Here, the electronic apparatus may receive another bookshelf image only when located at a predetermined distance from another electronic apparatus. In addition, the electronic apparatus may select an electronic book unit corresponding to a book image included in a bookshelf image to be transmitted to another electronic apparatus by an operation of the user etc., instead of transmitting a bookshelf image including book images corresponding to all electronic book units to another electronic apparatus.

According to another embodiment of the present invention, there is provided an electronic book providing system including a server apparatus and an electronic apparatus. The server apparatus includes a first storage, a first communication section, and a first controller. The first storage stores an electronic book obtained by digitizing a book constituted of at least one page in which at least one information item is represented, and associated information that is associated with the information item. The first controller generates an electronic book unit by adding first metadata to the information item and controls the first communication section to transmit the generated electronic book unit. The electronic apparatus includes a second communication section, a second storage, a display, a detector, and a second controller. The second communication section receives the transmitted electronic book unit. The second storage stores the received electronic book unit. The display displays the stored electronic book unit. The detector detects an operation of designating the information item, the operation being made by a user on the displayed electronic book unit. The second controller controls, when the operation of designating the information item is detected, the display to display the associated information that is associated with the information item, based on the first metadata added to the information item.

According to still another embodiment of the present invention, there is provided an electronic book providing method including storing an electronic book obtained by digitizing a book having at least one page in which at least one information item is represented, and associated information that is associated with the information item. When the electronic book is displayed by an external electronic apparatus and the information item of the electronic book is designated, an electronic book unit is generated by adding metadata to the information item so that display processing of the associated information is executed on the external electronic apparatus. The generated electronic book unit is transmitted to the external electronic apparatus.

According to still another embodiment of the present invention, there is provided an electronic book displaying method including storing an electronic book unit including an electronic book obtained by digitizing a book having at least one page in which at least one information item is represented and first metadata added to the information item. The electronic book unit is displayed, and an operation of designating the information item is detected, the operation being made by a user on the displayed electronic book unit. When the operation of designating the information item is detected, associated information that is associated with the information item is displayed based on the first metadata added to the information item.

According to still another embodiment of the present invention, there is provided a program causing a server apparatus capable of communicating with an external electronic apparatus to execute a storage step, a generation step, and a transmission step. The storage step includes storing an electronic book obtained by digitizing a book having at least one page in which at least one information item is represented, and associated information that is associated with the information item. The generation step includes generating, when the electronic book is displayed by the external electronic apparatus and the information item of the electronic book is designated, an electronic book unit by adding metadata to the information item so that display processing of the associated information is executed on the external electronic apparatus.

The transmission step includes transmitting the generated electronic book unit to the external electronic apparatus.

According to still another embodiment of the present invention, there is provided a program causing an electronic apparatus to execute a storage step, a first display step, a detection step, and a second display step. The storage step includes storing an electronic book unit including an electronic book obtained by digitizing a book having at least one page in which at least one information item is represented and first metadata added to the information item. The first display step includes displaying the electronic book unit. The detection step includes detecting an operation of designating the information item, the operation being made by a user on the displayed electronic book unit. The second display step includes displaying, when the operation of designating the information item is detected, associated information that is associated with the information item, based on the first metadata added to the information item.

As described above, according to the embodiments of the present invention, it is possible to easily lead a user to various types of information with an electronic book as a starting point.

BRIEF DESCRIPTION OF DRAWINGS

[FIG. 10] Diagrams showing a state of the display processing that uses item metadata as a reference of a viewpoint movement in the embodiment of the present invention.

DESCRIPTION OF EMBODIMENTS

Hereinafter, an embodiment of the present invention will be described with reference to the drawings.

(General Outline of Electronic Book Providing System)

Figure 1:
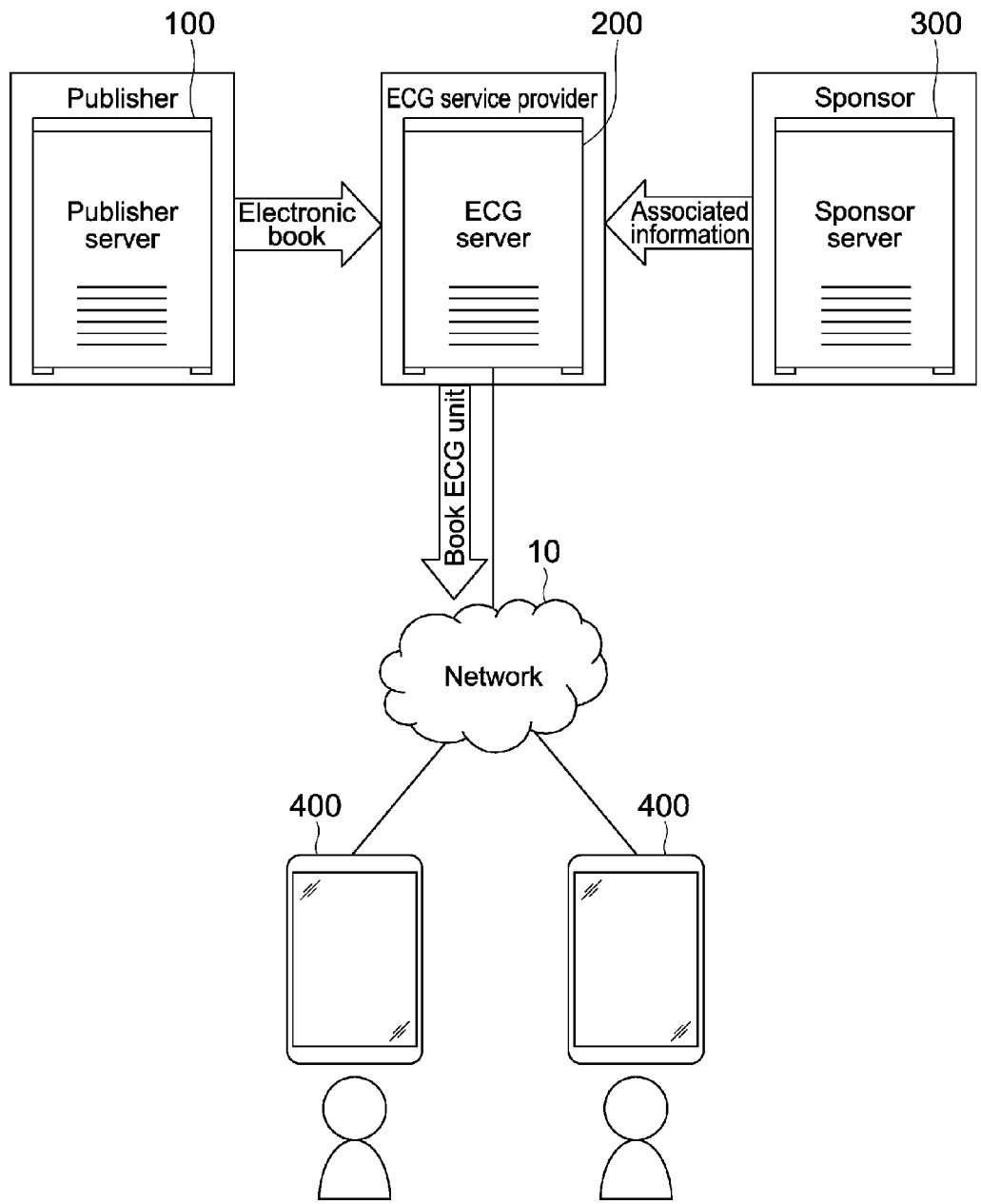
[FIG. 1] A schematic diagram showing an electronic book providing system in an embodiment of the present invention.

FIG. 1 is a schematic diagram showing an electronic book providing system in the embodiment of the present invention. As shown in FIG. 1, the electronic book providing system in this embodiment includes a publisher server 100, an ECG (Electronic Content Guide) server 200, a sponsor server 300, and receiving terminals 400.

The publisher server 100 is operated and managed by a publisher. The publisher server 100 stores electronic books obtained by digitizing books published by the publisher, and provides the electronic books to the ECG server 200. Here, the electronic books are those obtained by digitizing all kinds of books such as a magazine, a novel, a comic, a dictionary, a thesaurus, a picture book, a photo book, a poetry book, an art collection book, a technical book, and a map while maintaining a layout of the original printed books.

The electronic book is constituted of one or more pages, and an information item is displayed on each page. The information item refers to, for example, image information such as a photo, a drawing, and an illustration of a person, a character, a product, or the like, and letter information such as an article and a text.

The sponsor server 300 is operated and managed by a sponsor. The sponsor server 300 stores associated information that is associated with the information item included in the electronic book, and provides the associated information to the ECG server 200. The associated information may be directly provided to the receiving terminal 400 without involving the ECG server 200. Specific examples of the sponsor will be described later.

In a case where the information item is an image of a person or a character, the associated information is information on a program, a movie, and a game in which that person or character appears, product information of a DVD, a BD (Blu-ray Disc), a book, a music piece, sundry goods, and the like associated with that person or character (advertisement information), a profile of that person or character, etc. In a case where the information item is a product image of clothes or food, for example, the associated information is detailed information of those products, information used for purchasing those products (settlement information), etc. In a case where the information item is an image of a specific location or facility (shop etc.), the associated information is map information, shop information, and the like of the location or facility. Further, in a case where the information item is letter information such as an article and a text, the associated information is a product and a service (program etc.) retrieved by the letter information, other articles and texts including contents similar to the letter information, and the like. Moreover, the associated information may be contents themselves such as a moving image, a still image, and a music piece that are associated with the information item.

The ECG server 200 is managed and operated by an ECG service provider that provides an ECG service. The ECG server 200 generates a book ECG unit based on the electronic book provided from the publisher server 100 and the associated information provided from the sponsor server 300. The ECG server 200 then provides the book ECG unit to the receiving terminal 400 of a user (general consumer) via a network 10 such as the Internet, for example. Accordingly, the electronic book and the associated information are provided to the receiving terminal 400.

The ECG service is a service that associates all kinds of contents such as a broadcast program, a VOD (Video On Demand) program, music, a moving image, a CD, a DVD, a BD, a game, a book, a map, and shop information to thereby increase opportunities for a user to approach contents. When the user has more opportunities to approach contents, "notice" of the user is evoked increasingly and actions of the user also increase, with the result that improvements in an audience rating of a program, sales of a product, and the like can be expected.

In the system as described above, the publisher may receive a usage fee or royalties for the electronic book from the ECG service provider. Moreover, the sponsor may pay the ECG service provider as, for example, an advertisement fee, a fee required for the associated information to be provided to the user of the receiving terminal 400 from the ECG server 200.

(Overall Structure of Electronic Book Providing System)

Figure 2:
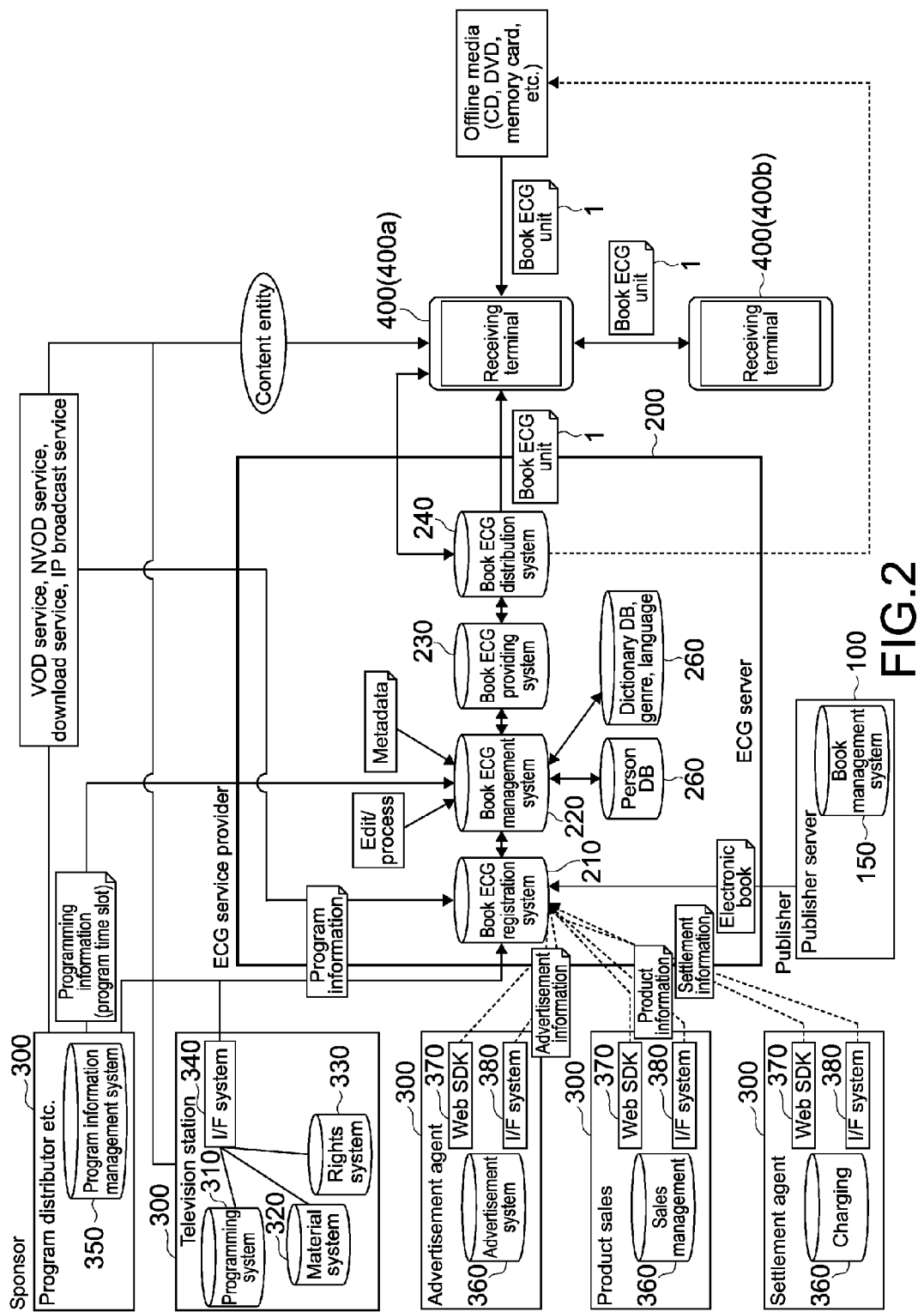
[FIG. 2] A diagram showing an overall structure model of the electronic book providing system in the embodiment of the present invention.

FIG. 2 is a diagram showing an overall structure model of the electronic book providing system in this embodiment.

(Structure of Sponsor Server)

As shown in FIG. 2, the sponsor server 300 that is operated and managed by the sponsor includes, for example, servers of program providers such as a television station, a data broadcast station, and a program distributor, and an advertisement agent, an EC (Electronic Commerce) company, or a settlement agent that provides services of advertisement/merchandising or handling of settlement.

The server of the television station as the sponsor server 300 provides video/audio information on a program, data broadcast information, and EPG-SI information to the receiving terminal 400, and also provides program information on the program to the ECG server 200 as the associated information. Here, the program information includes program introductory information (including still-image information), programming information, group information, supplementary information, segment information of the program, and the like. The server of the television station operates a programming system 310, a material system 320, a rights system 330, and the like that manage the program information on the program. The segment information is a program that identifies events in a constituent element (segment) of the program and in which commands issued to production modules corresponding to the events are arranged in a time sequence.

The server of the program distributor or data broadcast station as the sponsor server 300 operates a program information management system 350 that manages program information on a program time slot of a distributed program (programming information), the program information being provided in a form of VOD, NVOD (Near VOD), download, and an IP broadcast service, for example. The program information described above is also provided to the ECG server 200 as the associated information.

The servers of the EC company, the advertisement agent, and the settlement agent as the sponsor server 300 (hereinafter, collectively referred to as EC company server) provide advertisement information, merchandising information, and settlement information as the associated information to the receiving terminal 400 via the ECG server 200. The EC company server operates various types of information processing systems 360 for advertisement, sales management, charging, etc., in accordance with a type of a business, a Web SDK (Software Development Kit) 370, an I/F system 380, and the like. The server of the settlement agent as the sponsor server 300 provides settlement information in carrying out purchasing processing of a product based on advertisement information and merchandising information.

(Functional Structure of ECG Server)

The ECG server 200 is used for the ECG service provider to produce, manage, and provide information on a program as ECG data. The ECG server 200 has functions of a book ECG registration system 210, a book ECG management system 220, a book ECG providing system 230, a book ECG distribution system 240, and the like. Those functions are executed as hardware and software.

The book ECG registration system 210 registers the associated information such as program information, programming information, advertisement information, product information, and settlement information provided from the sponsor server 300. The book ECG registration system 210 also registers an electronic book provided from the publisher server 100.

The book ECG management system 220 manages the associated information such as program information, programming information, advertisement information, product information, and settlement information and the electronic book that are registered in the book ECG registration system 210. The book ECG management system 220 edits, processes, and updates the associated information variously as appropriate, and generates various types of metadata corresponding to the electronic book, a page of the electronic book, an information item of the page, and the like.

Further, the book ECG management system 220 is connected to databases 260 such as a person DB and a dictionary DB, and manages detailed information on program information including programming, casts and a genre, and music or an event associated with the program. The databases 260 are referenced in the generation processing of the various types of metadata as needed.

Furthermore, the book ECG management system 220 generates a book ECG unit 1 by adding the various types of generated metadata to the electronic book. The various types of metadata will be described later in detail.

The book ECG providing system 230 cooperates with the book ECG management system 220 to thereby provide the book ECG unit 1 to the receiving terminal 400 via the book ECG distribution system 240. In addition to the case where the book ECG unit 1 is provided to the receiving terminal 400 from the ECG server 200, it may sometimes be provided via an offline medium such as a CD, a DVD, and a memory card.

The receiving terminal 400 can exchange the book ECG unit 1 provided from the ECG server 200 or the offline medium described above with another receiving terminal 400 (between receiving terminals 400a and 400b).

(Hardware Structure of ECG Server)

Figure 3:
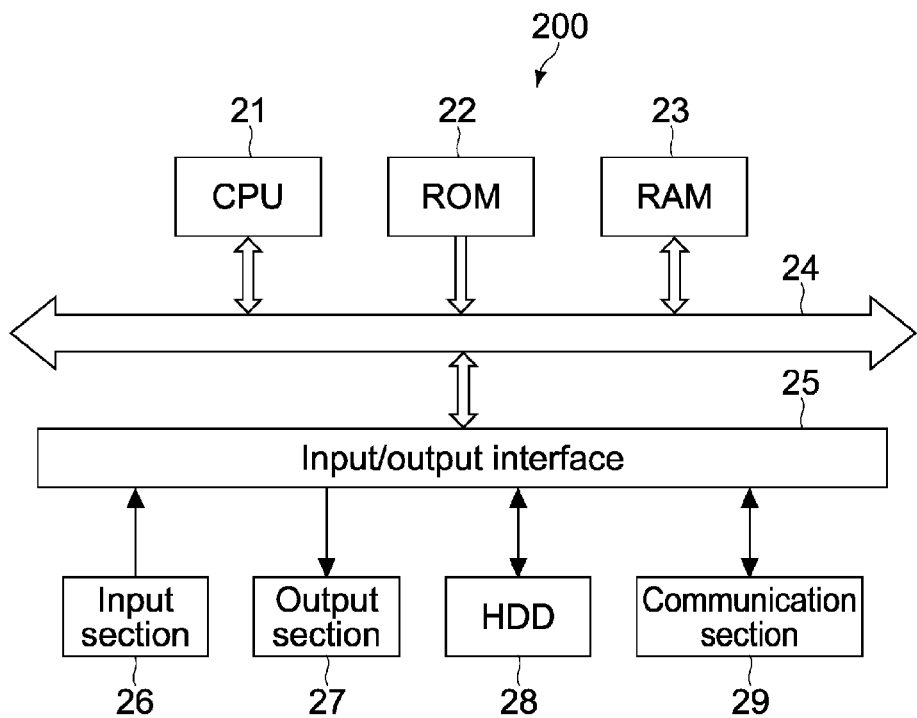
[FIG. 3] A diagram showing a hardware structure of an ECG server in the embodiment of the present invention.

FIG. 3 is a diagram showing a hardware structure of the ECG server 200.

As shown in FIG. 3, the ECG server 200 includes a CPU (Central Processing Unit) 21, a ROM (Read Only Memory) 22, and a RAM (Random Access Memory) 23 that are connected to each other via a bus 24. The ECG server 200 also includes an input/output interface 25, an input section 26, an output section 27, an HDD (Hard Disk Drive) 28, and a communication section 29. The input section 26, the output section 27, the HDD 28, and the communication section 29 are connected to the input/output interface 25.

The CPU 21 accesses the RAM 23 and the like as needed and controls the whole blocks of the ECG server 200 integrally while performing various types of operation processing. The ROM 22 is a nonvolatile memory that fixedly stores an OS executed by the CPU 21, programs, and firmware such as various parameters. The RAM 23 is used as a work area or the like of the CPU 21 and temporarily stores the OS, various programs being executed, and various types of data being processed. The CPU 21 functions as the book ECG management system 220 and the book ECG providing system 230.

The input section 26 is a keyboard, a mouse, a touch pad, or a button, for example, and receives various operations of a user and outputs input operation signals to the CPU 21. The output section 27 is a display such as an LCD (Liquid Crystal Display) or OEL (Organic Electro-Luminescence) display that outputs video signals of various contents, a speaker that outputs audio signals of various contents, or the like.

The HDD 28 stores, in addition to the OS and the various programs, an application necessary for generating the book ECG unit 1, the databases 260, the associated information, the various types of generated metadata, and various types of data such as the book ECG unit 1 in a built-in hard disk.

The communication section 29 includes a network interface card or a modem, for example, and performs communication processing with other apparatuses such as the publisher server 100, the sponsor server 300, and the receiving terminal 400 via the network 10 such as the Internet. The input section 26, the HDD 28, and the communication section 29 also function as the book ECG registration system 210. The communication section 29 also functions as the book ECG distribution system 240.

(Hardware Structure of Receiving Terminal)

Figure 4:
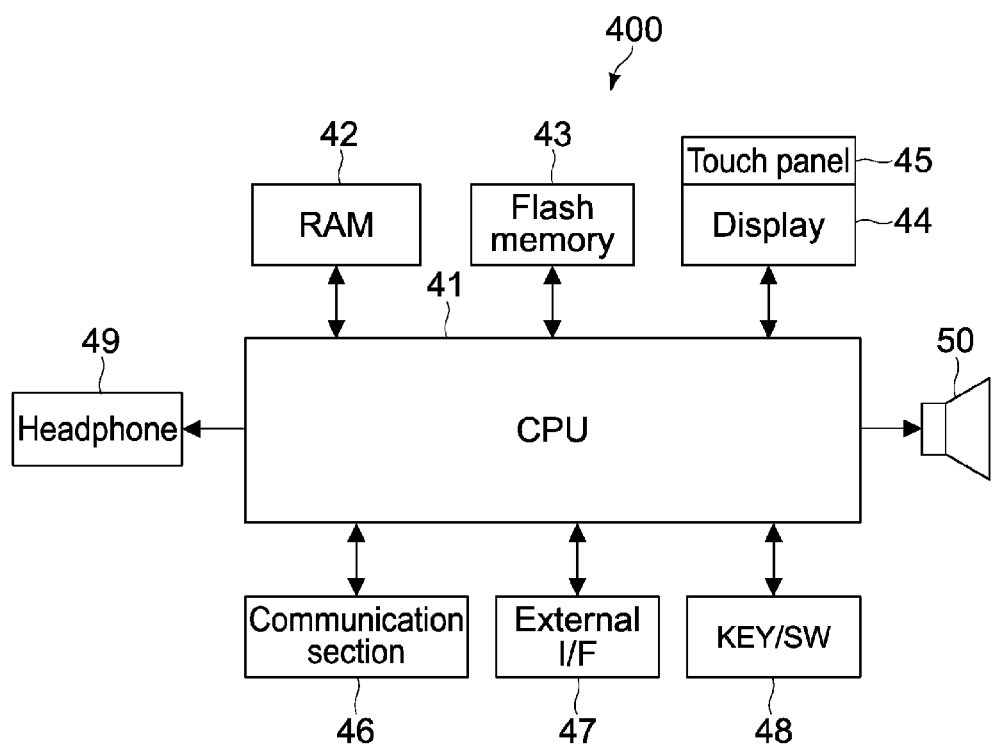
[FIG. 4] A diagram showing a hardware structure of a receiving terminal in the embodiment of the present invention.

FIG. 4 is a diagram showing a hardware structure of the receiving terminal 400.

The receiving terminal 400 includes a CPU 41, a RAM 42, and a flash memory 43. The receiving terminal 400 also includes a display 44, a touch panel 45, a communication section 46, an external I/F (interface) 47, a key/switch section 48, a headphone 49, and a speaker 50.

The CPU 41 performs various operations by exchanging signals with the respective sections of the receiving terminal 400, and integrally controls processing executed in the receiving terminal 400, such as display processing of the book ECG unit 1.

The RAM 42 is used as a work area of the CPU 41 and temporarily stores various types of data such as contents that are processed by the CPU 41 and programs such as applications for displaying the book ECG unit 1.

The flash memory 43 is a NAND-type flash memory, for example. The flash memory 43 stores, in addition to the book ECG unit 1 received from the ECG server 200 or the like, various contents such as a moving image, a still image, and a music piece, and various programs such as a control program executed by the CPU 41 and an application that executes display processing of the book ECG unit 1. The application may be stored in another recording medium such as a memory card (not shown). Further, the receiving terminal 400 may include an HDD instead of or in addition to the flash memory 43.

The display 44 is, for example, an OELD (Organic Electro-Luminescence Display) or LCD of TFTs (Thin Film Transistors), and displays an image of the associated information and the book ECG unit 1, for example.

The display 44 is integrally formed with the touch panel 45. The touch panel 45 detects a touch operation of a user and transmits it to the CPU 41, for example, in a state where the book ECG unit 1 is displayed. Although a resistance film system or a capacitance system is used as an operation system of the touch panel 45, other systems such as an electromagnetic induction system, a matrix switch system, a surface elastic wave system, and an infrared-ray system may be used instead.

The communication section 46 includes a network interface card or a modem, for example, and performs communication processing with other apparatuses such as the ECG server 200, the sponsor server 300, and other receiving terminals 400 via the network 10. The communication section 46 may include a wireless LAN (Local Area Network) module, or may include a WWAN (Wireless Wide Area Network) module.

The external I/F 47 is connected to an external apparatus such as a memory card in which the book ECG unit 1 is stored, and exchanges data with the external apparatus according to various standards such as a USB (Universal Serial Bus) and an HDMI (High-Definition Multimedia Interface).

The key/switch section 48 receives, for example, a user's operation that is related to display etc. of the book ECG unit 1 but cannot be input by the touch panel 45, and transmits an input signal to the CPU 41.

The headphone 49 and the speaker 50 output an audio signal that is stored in the flash memory 43 or the like or input from the communication section 46, the external I/F 47, or the like.

Though not shown, the receiving terminal 400 may include an optical disc drive for reproducing a CD or a DVD in which the book ECG unit 1 is stored.

(Operation of Electronic Book Providing System)

Next, an operation in the electronic book providing system structured as described above will be described. In the following descriptions, the CPU 21 of the ECG server 200 or the CPU 41 of the receiving terminal 400 is described as a main subject of operations. However, the operations are also performed in cooperation with a program executed under control of the CPU 21 or the CPU 41.

(Operation of ECG Server)

Figure 5:
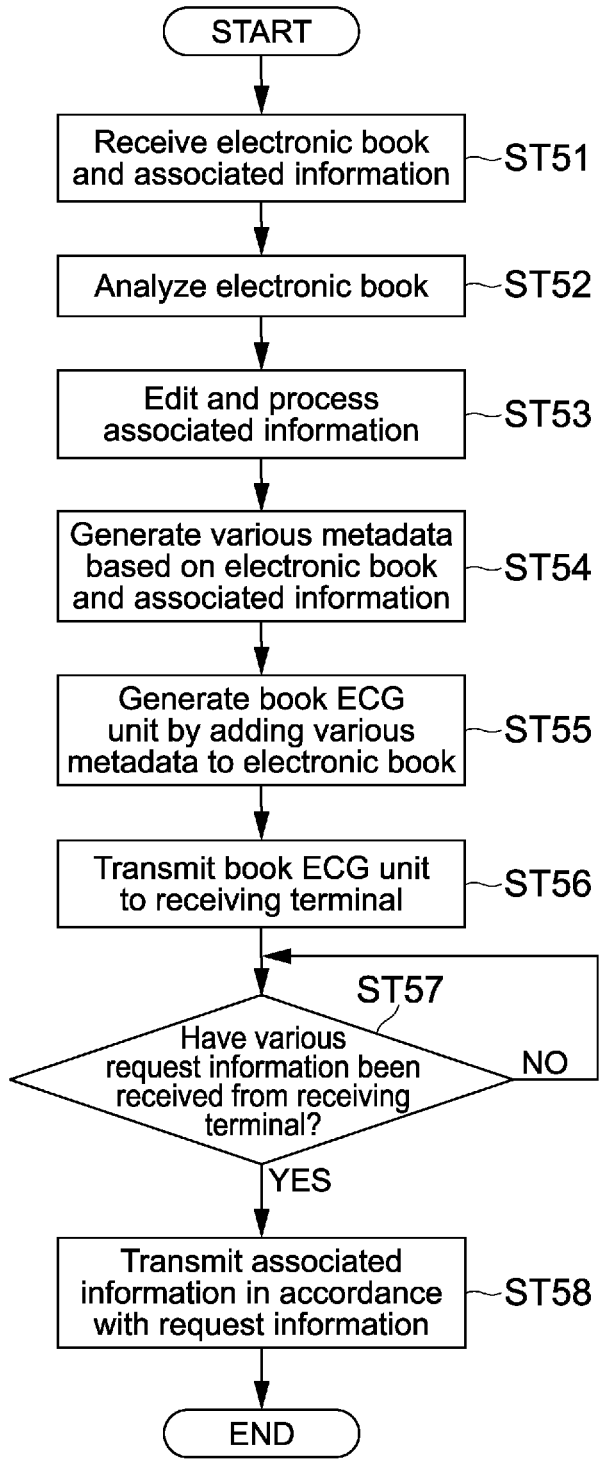
[FIG. 5] A flowchart showing a flow of generation processing of a book ECG unit by the ECG server in the embodiment of the present invention.

First, the generation processing of the book ECG unit 1 by the ECG server 200 will be described. FIG. 5 is a flowchart showing a flow of the generation processing of the book ECG unit 1 by the ECG server 200.

As shown in FIG. 5, the CPU 21 of the ECG server 200 first receives an electronic book from the publisher server 100 and receives and registers various types of associated information from the sponsor server 300 by the book ECG registration system 210 (Step 51).

Subsequently, by the book ECG management system 220, the CPU 21 analyzes a page structure of the received electronic book and an information item etc. included in each page (Step 52). Further, the CPU 21 analyzes the various types of received associated information to thereby edit and process them as needed (Step 53).

Then, by the book ECG management system 220, the CPU 21 generates various types of metadata based on the electronic book and the associated information, in accordance with the page structure of the electronic book, the information item, and the like (Step 54). Subsequently, by the book ECG management system 220, the CPU 21 generates a book ECG unit 1 by adding the various types of metadata to the electronic book (Step 55).

Then, the CPU 21 transmits the generated book ECG unit 1 to the receiving terminal 400 by the book ECG providing system 230 and the book ECG distribution system 240 (Step 56). The transmission processing may include settlement processing for a user of the receiving terminal 400 to purchase the book ECG unit 1.

After that, upon receiving various types of request information that are input in the receiving terminal 400 regarding the book ECG unit 1 (YES of Step 57), the CPU 21 transmits associated information corresponding to the various types of request information to the receiving terminal 400, to thereby display or reproduce the associated information (Step 58). The processing corresponding to the request information will be described later in detail together with descriptions on an operation of the receiving terminal 400 to be described later.

(Data Structure of Book ECG Unit)

FIG. 6 are diagrams showing a data structure of the generated book ECG unit 1.

Figure 6A:
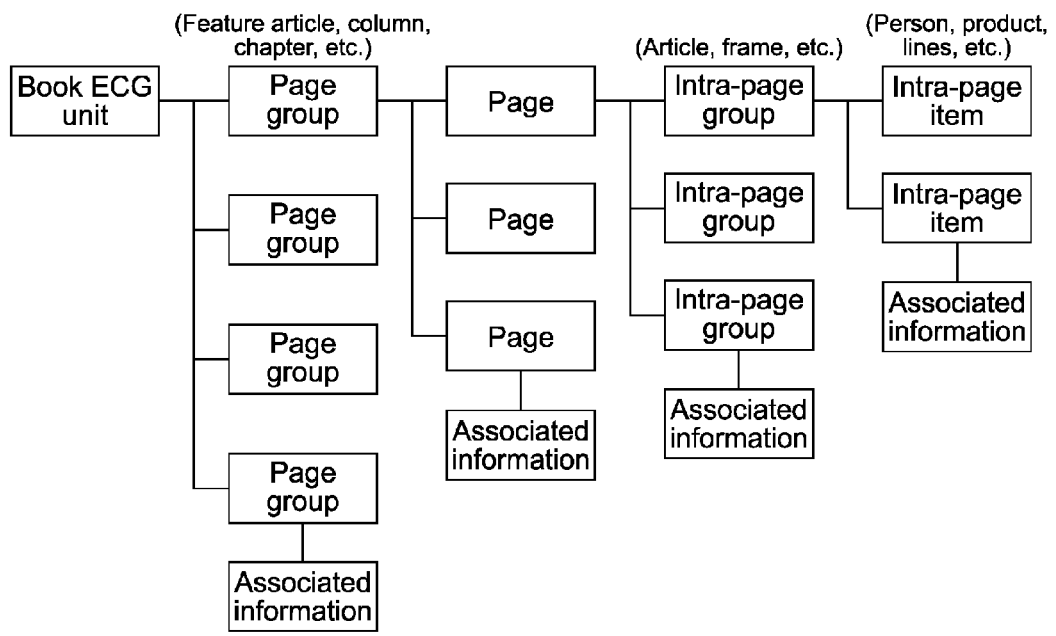
[FIG. 6] Diagrams showing a data structure of the book ECG unit in the embodiment of the present invention.
Figure 6B:
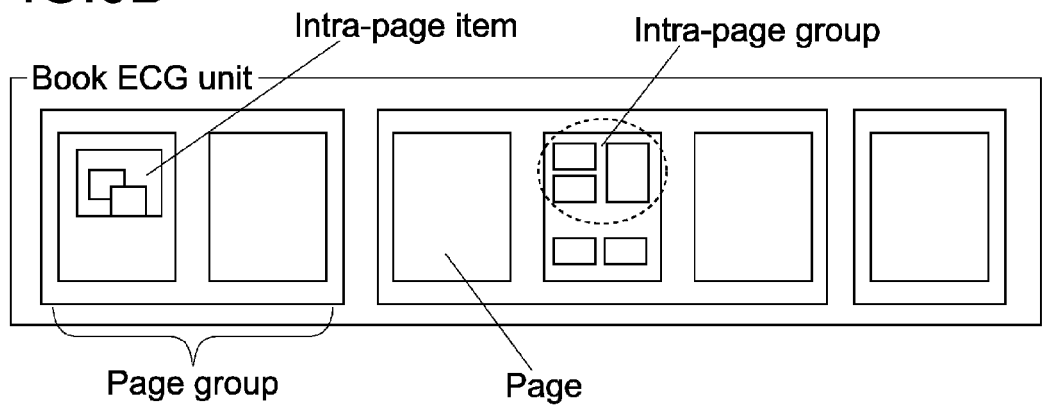

As shown in FIGS. 6A and 6B, the book ECG unit 1 has a plurality of page groups, each of which includes one or more pages. For example, the page group corresponds to a feature article or a column of a magazine, a chapter of a book, or the like.

Further, each page includes one or more intra-page groups, each of which includes one or more intra-page items (information items). The intra-page items (information items) refer to elements as described above, such as a person, a character, a product, and lines. The intra-page group is a group obtained by grouping information items having an association out of the above information items. For example, the intra-page items included in a single article or frame belong to the same intra-page group.

When the book ECG unit 1 is generated, the ECG server 200 adds metadata to each of the book ECG unit 1 itself, the page group, the page, the intra-page group, and the intra-page item. The metadata includes scripts or the like for displaying the associated information associated with each of the book ECG unit 1 itself, the page group, the page, the intra-page group, and the intra-page item.

The metadata added to the book ECG unit 1 itself represents data on a publisher, an author, a genre, contents, a related location, etc. of the electronic book as a source thereof. Hereinafter, this metadata is referred to as book metadata.

The metadata added to the page group represents items common to pages, such as a feature article, a column, and a chapter as described above. Hereinafter, this metadata is referred to as page group metadata.

The metadata added to the page represents contents, a genre, a category, or the like of the page. Hereinafter, the metadata is referred to as page metadata.

The metadata added to the intra-page group represents items common to the intra-page items, such as the article and the frame as described above. Further, in a case where a large number of information items are included in the same article, only items that are seemed to be important for a user out of those information items may be grouped as an intra-page group by the metadata. Hereinafter, the metadata is referred to as intra-page group metadata.

The metadata added to the intra-page item is data for displaying the associated information associated with the information item included in the page. Hereinafter, the metadata is referred to as item metadata. The item metadata may be added as data for displaying (reproducing) contents or information itself on the contents as the associated information, or added as a search keyword for executing search processing of the associated information. In a case where the item metadata is added as a search keyword, the item metadata also includes designation of a search location (online/offline). Further, the item metadata includes information on a position (point) at which the item is present in the page.

Those various types of metadata are associated with each other and used for display processing of the associated information in the receiving terminal 400. Further, the book ECG unit 1 may include the associated information itself. As shown in FIG. 6A, the associated information is typically associated with the intra-page item, but may alternatively be associated with the page, the page group, or the intra-page group. There may be cases where the associated information is included as entire information associated with the intra-page item or the like (information displayed on receiving terminal 400), the associated information is included as information used only for identifying the information associated therewith, and the associated information is included as part of the information associated therewith. Moreover, the various types of metadata themselves may include the entire or part of the associated information in addition to the scripts or the like, or the book ECG unit 1 may include associated information separate from the various types of metadata.

(Operation of Receiving Terminal)

Next, an operation of the receiving terminal 400 that uses the book ECG unit 1 generated by the ECG server 200 will be described.

(Display Processing of Book ECG Unit in One Page)

Figure 7:
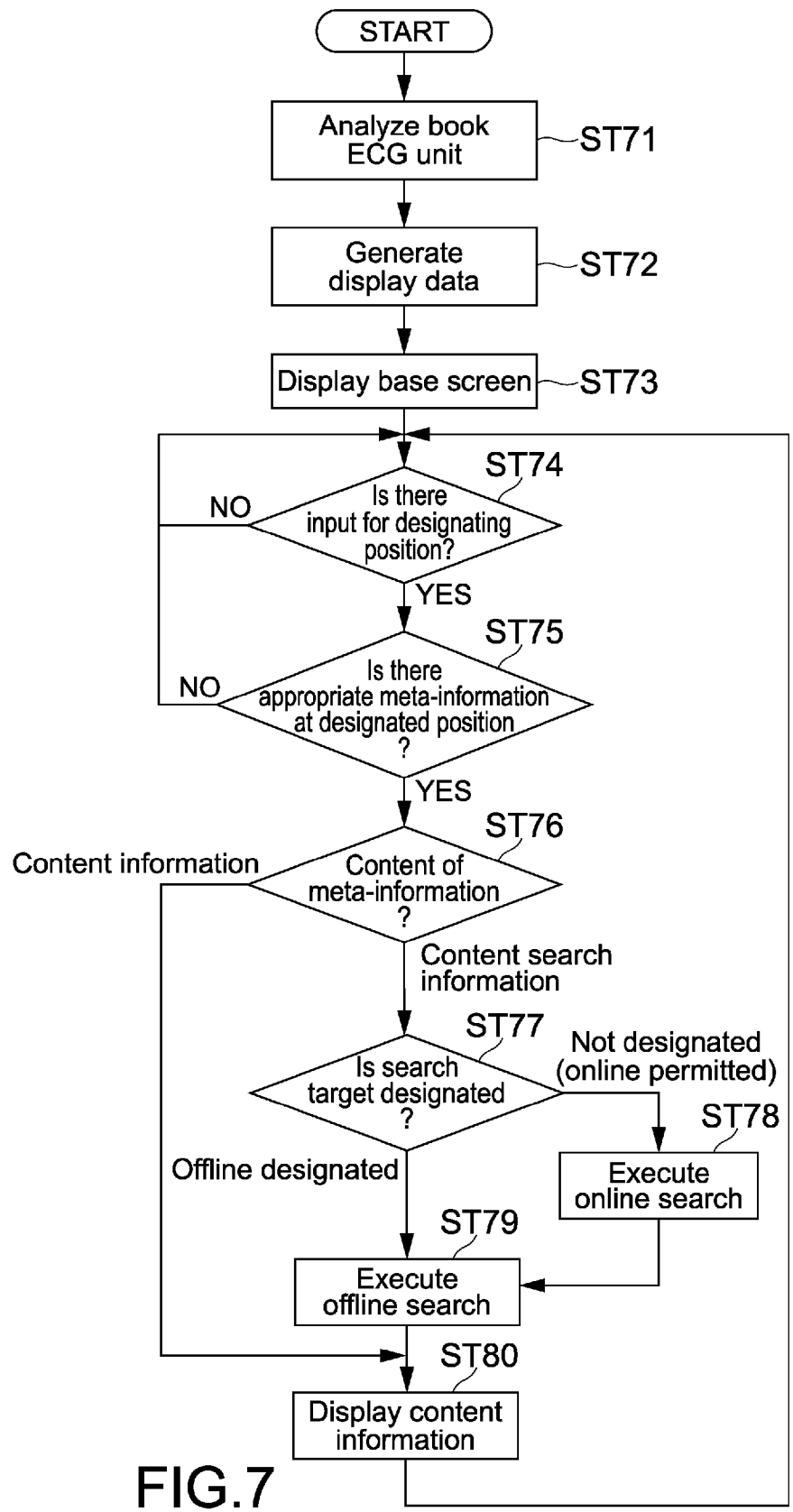
[FIG. 7] A flowchart showing a flow of display processing of the book ECG unit by the receiving terminal according to the embodiment of the present invention.

FIG. 7 is a flowchart showing a flow of the display processing of one page of the book ECG unit 1 by the receiving terminal 400.

As shown in FIG. 7, upon receiving a display instruction of a book ECG unit 1 from the user after receiving the book ECG unit 1 from the ECG server 200 or via various offline media and storing it, the CPU 41 of the receiving terminal 400 analyzes the structure of the book ECG unit 1 (Step 71). In other words, the CPU 41 acquires a page structure of each page group, each page, or the like of the electronic book included in the book ECG unit 1, and various types of metadata corresponding thereto.

Subsequently, the CPU 41 generates display data to be visually provided to the user (image data of each page of electronic book) out of the book ECG unit 1 (Step 72), and displays a base screen of the book ECG unit 1 on the display 44 (Step 73).

Figure 8:
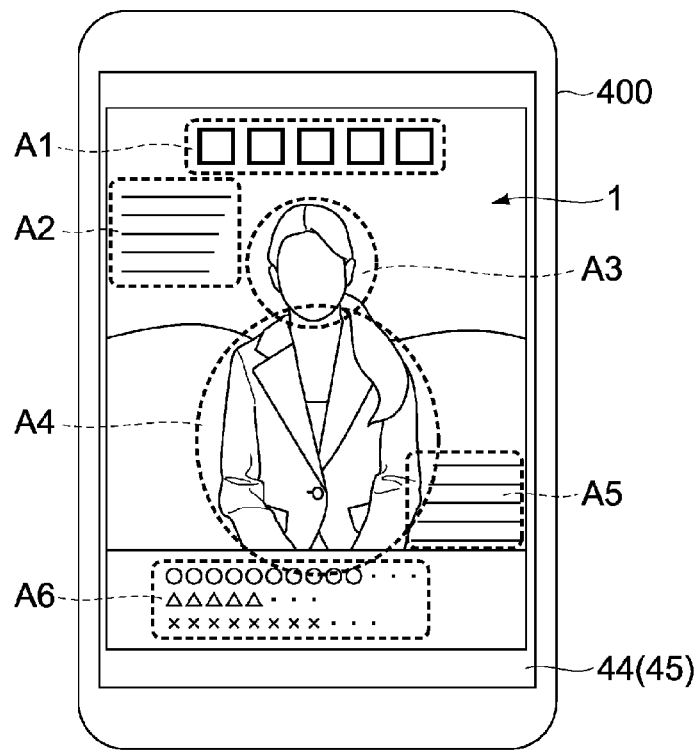
[FIG. 8] A diagram showing a display example of a base screen of the book ECG unit in the embodiment of the present invention.

FIG. 8 is a diagram showing a display example of the base screen. As shown in FIG. 8, the base screen is constituted of image data corresponding to one page of the book ECG unit 1. At normal times, the first page of the book ECG unit 1 is displayed as the base screen. Each page includes a plurality of information items (A1 to A6). In this example, one page of the book ECG unit 1 that is generated based on a digital magazine is displayed. In this page, the information items A1, A2, A5, and A6 are letter information (articles) and the information items A3 and A4 are image information (person and clothes). As described above, those information items are each added with the item metadata, and the CPU 41 of the receiving terminal 400 also acquires those item metadata.

Referring back to FIG. 7, the CPU 41 judges whether an input for designating a position has been made by the user on the base screen of the book ECG unit 1 (Step 74). In other words, the CPU 41 judges whether the touch panel 45 has detected a touch operation with respect to a certain position on the base screen.

When judging that the input for designating a position has been made (YES), the CPU 41 judges whether appropriate item metadata is present at the designated position (Step 75). Then, when judging that item metadata is present (YES), the CPU 41 analyzes contents of that item metadata (Step 76).

Specifically, the CPU 41 judges which of content information and content search information (keyword) that item metadata indicates.

In a case where the item metadata indicates content information, the CPU 41 displays the content information as associated information in accordance with the item metadata (Step 80).

Alternatively, in a case where the item metadata indicates content search information, the CPU 41 judges whether a search location is designated in the item metadata (Step 77).

In a case where the search location is designated to be offline, the CPU 41 retrieves a content that matches the designated search keyword from the flash memory 43 of the receiving terminal 400 (Step 79), and displays content information as a search result (Step 80). Further, in a case where an image is included as item metadata, an image search may be executed in addition to a search using a keyword.

In a case where the search location is not designated to be offline (online search is permitted), the CPU 41 retrieves content information from the Internet or the like by the communication section 46 (Step 78). Moreover, the CPU 41 also executes the offline search (Step 79) and displays both results in combination as content information (Step 80).

In this case, the content information retrieved online may be retrieved from the ECG server 200 or the sponsor server 300, or may be retrieved from other search engines. Further, the item metadata includes a search condition on the online search (exceptive matter), and only information that is subjected to filtering by the search condition may be displayed as content information.

Figure 9:
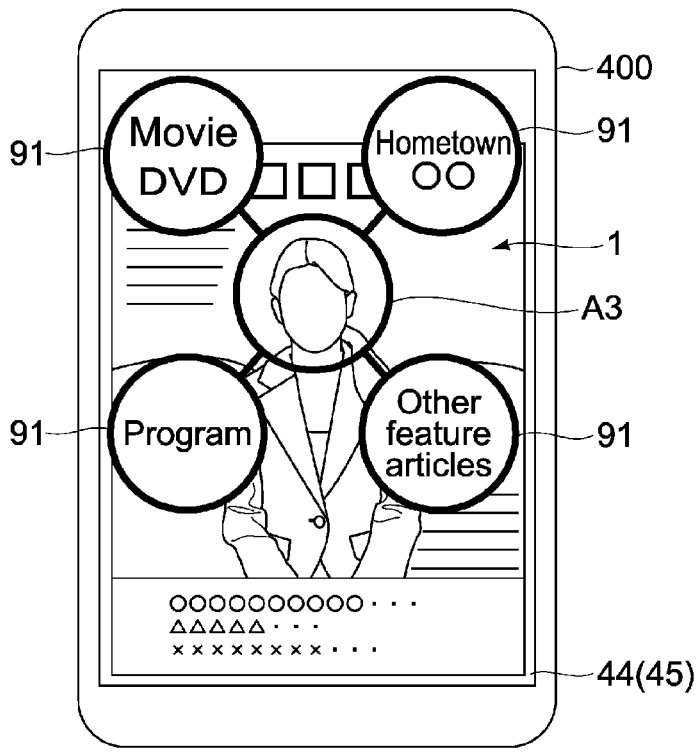
[FIG. 9] A diagram showing a state where associated information is displayed from information items of the book ECG unit in the embodiment of the present invention.

FIG. 9 is a diagram showing a state where the content information serving as associated information is displayed from the information items of the book ECG unit 1. FIG. 9 shows an example of a case where the information item A3 indicating a person is designated by the user. The CPU 41 displays pieces of associated information 91 retrieved online or offline based on the item metadata added to the information item A3 indicating that person. In FIG. 9, as the associated information 91, information that introduces a movie/DVD associated with that person, information on a program in which that person appears, information on a hometown of that person, and information on other feature articles associated with that person are displayed around the information item A3.

When the user designates (touches) those pieces of the associated information 91, the CPU 41 further displays detailed information thereof, settlement information of a product, and the like. For example, in a case where the information on a movie/DVD is designated as the associated information, the CPU 41 displays detailed information of the movie, reproduces a trailer, or displays a screen for reserving a ticket or a screen for purchasing the DVD. In a case where the information on a program is designated, the CPU 41 displays a timer recording screen for the program or detailed information of the program. In a case where the information of other feature articles is designated, the CPU 41 extracts a page of an associated feature article from the book ECG unit 1 or another book ECG unit 1 that is stored in the flash memory 43 or the like, and displays the page. In a case where the information on the hometown is designated, the CPU 41 displays information on the hometown of that person (for example, information of accommodations or specialty products and screen for reserving accommodation or purchasing product). All pieces of information for displaying those pieces of information are also included in the book ECG unit 1 as the item metadata, and the CPU 41 sequentially displays associated information according to those pieces of information.

Further, in a case where a content of a moving image is set to be reproduced as the item metadata, the CPU 41 can also reproduce the moving image such that an information item as a still image starts to move when designated by the user. The moving image in this case may be provided by download or streaming from the ECG server 200 or the sponsor server 300 in each case, or may be included as a part of the book ECG unit 1.

As described above, as the associated information included in the book ECG unit 1, there are information including all pieces of information on a content associated with the information item and information including only information for identifying the content (ID etc.). In the former case, the associated information of the content is immediately displayed when the position designated by the user is detected. In the latter case, the information for identifying the content is first recognized when the position designation is detected. Subsequently, based on the identification information, the associated information of the content is acquired from the online database (ECG server 200) or the offline database (flash memory 43) and displayed. In the latter case, the receiving terminal 400 only needs to acquire the associated information only when necessary, and thus an information amount included in advance in the book ECG unit 1 is reduced, with the result that a load of communication processing carried out between the ECG server 200 and the receiving terminal 400 or an amount of stored data of the flash memory 43 or the like is reduced.

Taking an image of a person as an example of the information item, in the former case, information on a DVD of a movie in which the person appears (title, price, genre, etc.) are included in the book ECG unit 1 in advance as associated information, and those pieces of information are displayed immediately when the position designation is detected. On the other hand, in the latter case, only an ID for identifying the DVD is included as associated information in the book ECG unit 1, and information on the DVD is thus acquired from the ECG server 200 or the flash memory 43 based on the ID and displayed when the position designation is detected.

Further, as intermediate associated information of those two, part of information associated with the content may be added to the book ECG unit 1. Taking an image of a person as an example of the information item, only basic information on a DVD of a movie in which the person appears (ID, title, general outline, etc.) are included in the book ECG unit 1 in advance as item metadata, and other detailed information may be stored in the ECG server 200 or the receiving terminal 400. In this case, only the basic information are displayed when the position designation by the user is detected. When the user further gives an instruction (performs touch operation) with respect to those pieces of basic information, detailed information are acquired and displayed.

The CPU 41 repeats the above processing every time position designation is input on the base screen of the book ECG unit 1.

Here, as described above, each piece of item metadata includes information on a position (point) in a page of the information item. Moreover, the item metadata is associated with intra-page group metadata. Based on the position information and the intra-page group metadata, the CPU 41 may enlarge only information items belonging to the same intra-page group out of information items included in a page, and sequentially display the enlarged information items. That is, the CPU 41 may use the item metadata added to the respective points in the page as a reference of a viewpoint movement of the user.

FIG. 10 are diagrams showing a state of the display processing with the item metadata being used as a reference of a viewpoint movement. In FIG. 10A, out of the information items included in the base screen of the book ECG unit 1, the information items A2, A3, and A5 are assumed to belong to the same intra-page group. Further, respective pieces of item metadata are added to points P1, P2, and P3 that are the centers of areas of the information items A2, A3, and A5, respectively. In this case, the CPU 41 can enlarge the information items A2, A3, and A5 in the order of the points P1, P2, and P3. Such display (viewpoint movement) may be performed by a predetermined operation of the user or automatically performed at predetermined time intervals.

FIG. 10B shows a state where the information item A2 is enlarged with the point P1 as the center. FIG. 10C shows a state where the information item A3 is enlarged with the point P2 as the center. In the enlarged display, the associated information 91 corresponding to each information item is displayed.

As described above, by adding the item metadata to each point of the page, the CPU 41 can sequentially display only information items having an association, out of a plurality of information items. In other words, the CPU 41 can obtain only information items that the user is interested in by filtering and provide the information items collectively. Further, in a case where a display area of the display 44 of the receiving terminal 400 is relatively small, it may be difficult for the user to view a page of the book ECG unit 1 that is fully displayed. In this case, a part of the page needs to be enlarged in some cases. The CPU 41 can use the item metadata added to the respective points in the enlargement display to display the information items associated with each other together with the associated information, instead of mere enlargement display, and thus attract additional interest of the user.

Further, by the item metadata added to the respective points, all the information items in the page may be sequentially enlarged and displayed without filtering. In this case, the information items having an association may be displayed for a longer time than the information items having no association.

For example, out of the information items A1 to A6 shown in FIG. 8 that are sequentially enlarged in accordance with an operation of the user, the information items A2, A3, and A5 associated with each other may be displayed while the viewpoint movement is stopped for a predetermined time period, and the other information items A1, A4, and A6 may be displayed while the viewpoint movement passes without stopping with only a trail of the viewpoint movement being shown.

In addition, in a case where the viewpoint movement is automatically performed, the receiving terminal 400 may change the length of the time period, though the viewpoint movement is stopped in accordance with the presence/absence of the association. For example, the information items A2, A3, and A5 associated with each other may be displayed while the viewpoint movement is stopped for a long time, but the other information items A1, A4, and A6 may be displayed while the viewpoint movement is stopped for a short time or passes.

(Inter-Page Display Processing of Book ECG Unit)

Figure 11:
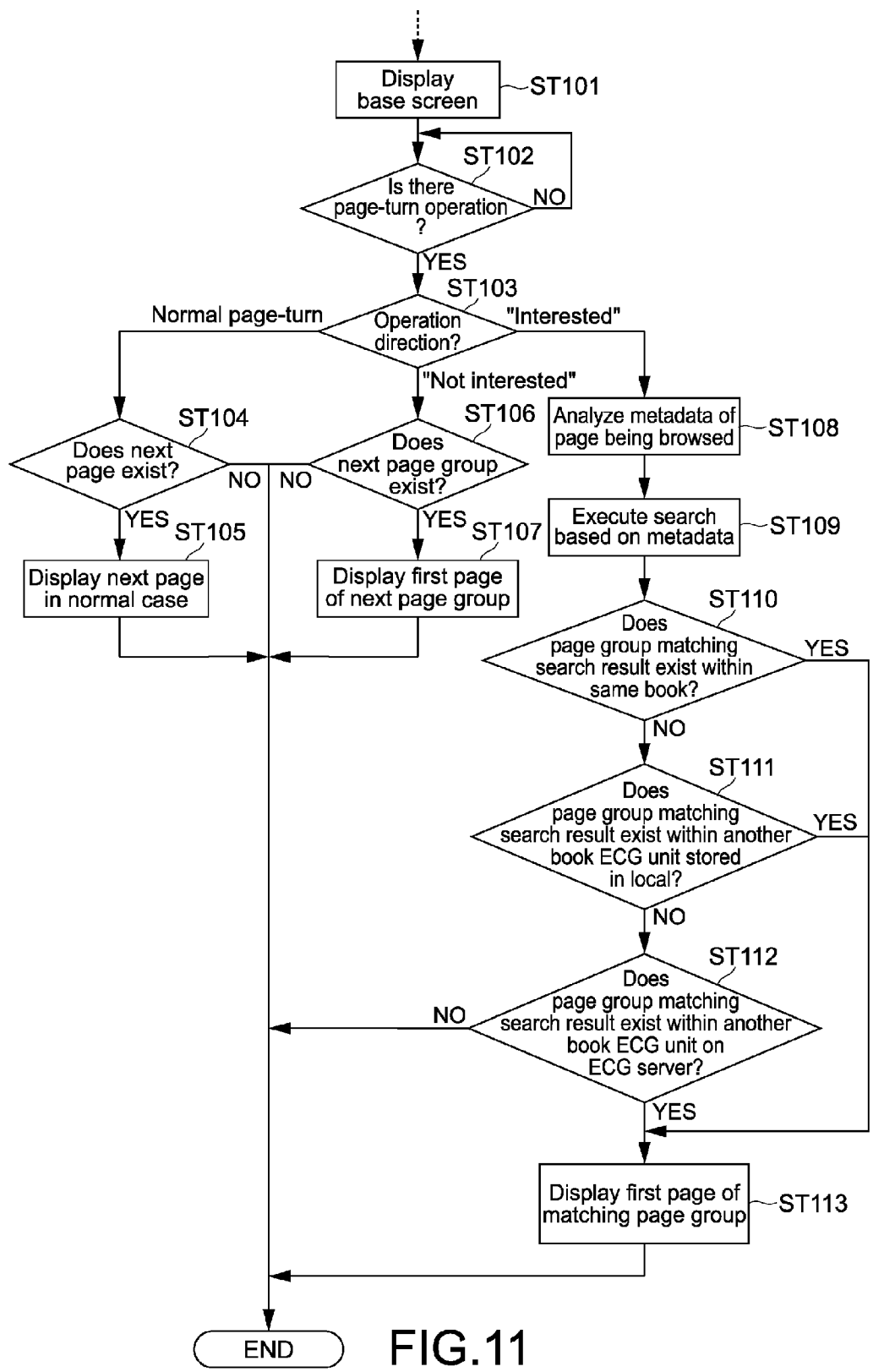
[FIG. 11] A flowchart showing a flow of inter-page display processing of the book ECG unit by the receiving terminal according to the embodiment of the present invention.

Next, the inter-page display processing of the book ECG unit 1 by the receiving terminal 400 will be described. FIG. 11 is a flowchart showing a flow of the inter-page display processing.

As shown in FIG. 11, upon displaying the base screen (Step 101), the CPU 41 judges whether a page-turn operation has been input on the base screen (Step 102). The page-turn operation is executed by the touch panel 45 detecting a slide operation or a flick operation made by a finger of the user, for example. Further, the touch panel 45 also detects a direction of the slide operation or flick operation, and thus the CPU 41 can execute different processing in accordance with the detected direction. In this embodiment, it is assumed that slide operations or flick operations in three directions of upward, horizontal (lateral), and downward directions are input. For example, it is assumed that an operation in the upward direction corresponds to "interested", an operation in the downward direction corresponds to "not interested", and an operation in the horizontal direction corresponds to "to the next page (normal page-turn)". The book ECG unit 1 is constructed of various types of metadata added thereto so that display is changed in accordance with those operations.

In a case where it is judged that the page-turn operation has been input (YES), the CPU 41 judges a type of the operation (Step 103). In a case where the operation direction is the horizontal direction (normal page-turn), the CPU 41 judges whether the next page exists in the book ECG unit 1 (Step 104). If the next page exists (YES), the CPU 41 displays the next page (Step 105), and if the next page does not exist (NO), the CPU 41 terminates the display processing.

In a case where the operation direction is the downward direction ("not interested"), the CPU 41 judges whether the next page group of the page group to which the page currently being browsed by the user belongs exists in the book ECG unit 1 (Step 106). In a case where the next page group exists (YES), the CPU 41 displays the first page of the next page group in the book ECG unit 1 (Step 107), and in a case where the next page group does not exist (NO), the display processing is terminated.

In a case where the operation direction is the upward direction ("interested"), the CPU 41 analyzes page metadata of the page currently being browsed (Step 108), and searches for a page group within the book ECG unit 1 by using letter information included in the page metadata as a search keyword (Step 109). Further, in a case where image information is included as the page metadata, a search of the page group may be executed using an image.

In a case where a page group matching the above page metadata exists within the book ECG unit 1 as a result of the above search (YES in Step 110), the CPU 41 displays the first page of the appropriate page group (Step 113).

In a case where a page group matching the above page metadata does not exist within the book ECG unit 1 as a result of the above search (NO in Step 110), the CPU 41 judges whether a page group matching the above page metadata exists within another book ECG unit 1 that is stored in a local memory such as the flash memory 43 (Step 111). In a case where a matching page group exists within the other book ECG unit 1 (YES), the CPU 41 displays the first page of the matching page group (Step 113).

In a case where a matching page group does not exist even in the other book ECG unit 1 (NO), the CPU 41 makes an inquiry to the ECG server 200 on whether a page group matching the page metadata exists within another book ECG unit 1 on the ECG server 200 (Step 112).

In a case where the ECG server 200 responds that a matching page group exists (YES), the CPU 41 receives the matching page group from the ECG server 200 and displays the first page of the matching page group (Step 113).

Also on the first page to be displayed, the display processing of the associated information corresponding to the operation for designating an information item that is made by the user as shown in FIGS. 9 and 10 is executed. In a case where a page-turn operation is input on the first page, processing that is the same as that described above is executed.

Further, for example, in a case where the receiving terminal 400 stores preference information of the user, the CPU 41 may execute, in addition to a search based on the page metadata, a search of a page group matching the preference information.

Furthermore, not only in a case where the various operations are input, but also in a case where a certain page is displayed for a predetermined time period or more while no operation is made thereon, the CPU 41 may automatically retrieve a page group that matches page metadata of that page and display it assuming that the user is interested in that page.

Each time a page of the book ECG unit 1 is displayed, the CPU 41 stores a display history (browsing history) of that page in the flash memory 43 or the like. Specifically, the CPU 41 stores, as the display history, information on each page of the book ECG unit 1 as to whether that page has already been read or not, and in the case where the page has already been read, how many times and for how long the page has been read on what dates and times. The display history is used in various types of processing to be described later.

The display history may be transmitted to the ECG server 200 together with user identification information such as an ID of the user each time the display history is created or every predetermined time period, and stored in the ECG server 200. In this case, the ECG server 200 stores the display history by associating it with the user identification information. In a case where a user browses the book ECG unit 1 using apparatuses other than the receiving terminal 400 (another receiving terminal, PC, etc.), the display history is transmitted from each of the apparatuses to the ECG server 200 together with the same user identification information, and the display histories of the apparatuses are stored as a block of display histories.

By the above processing, the receiving terminal 400 can not only sequentially display the next page, but also dynamically change a displayed page in accordance with a type of a user operation or interests of the user, when each page of the book ECG unit 1 is displayed. Accordingly, as compared to an electronic book in related art, the receiving terminal 400 can lead a user to a larger amount of information by changing page contents to information in which the user is more interested and further displaying associated information in that page.

(Display Processing of Page Thumbnail of Book ECG Unit)

Figure 12:
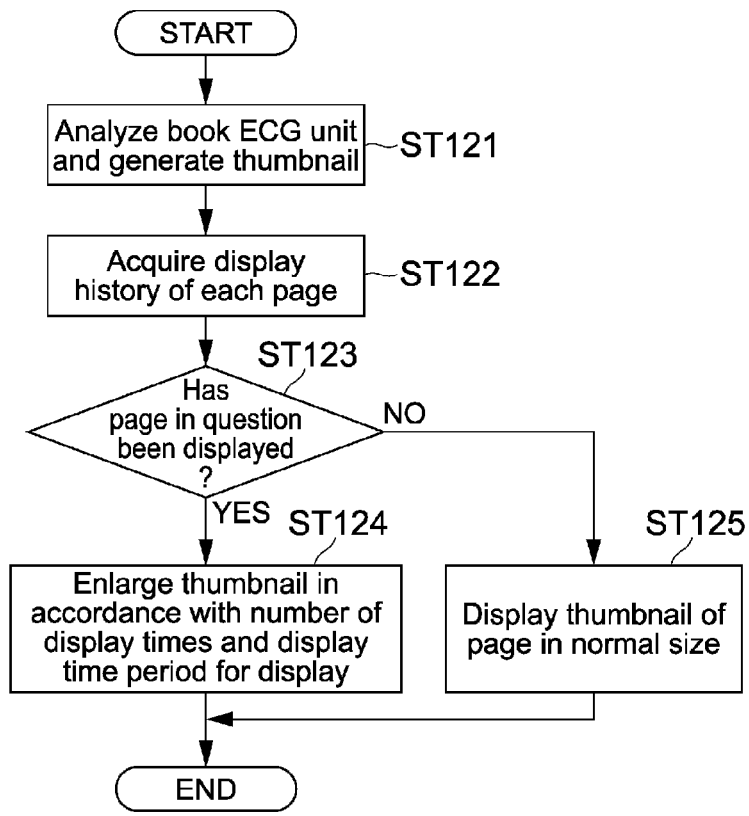
[FIG. 12] A flowchart showing a flow of page thumbnail display processing by the receiving terminal according to the embodiment of the present invention.

In this embodiment, the receiving terminal 400 can display a list of pages of a book ECG unit as thumbnails. When the pages are displayed as thumbnails, the receiving terminal 400 can reflect the above display history (browsing history) of each page on the thumbnails. Hereinafter, this page thumbnail display processing will be described. FIG. 12 is a flowchart showing a flow of the page thumbnail display processing.

As shown in FIG. 12, the CPU 41 analyzes a book ECG unit and generates a thumbnail of each page in a case where a request to display a page thumbnail is made by a user, for example (Step 121).

Subsequently, the CPU 41 acquires a display history of each page (Step 122) and judges, for each page, whether the page has been displayed (Step 123). Then, the CPU 41 enlarges and displays a thumbnail of the page that has been displayed in accordance with the number of display times and a display time period (Step 124), and displays a thumbnail of a page that has not been displayed in a normal size (Step 125).

Figure 13:
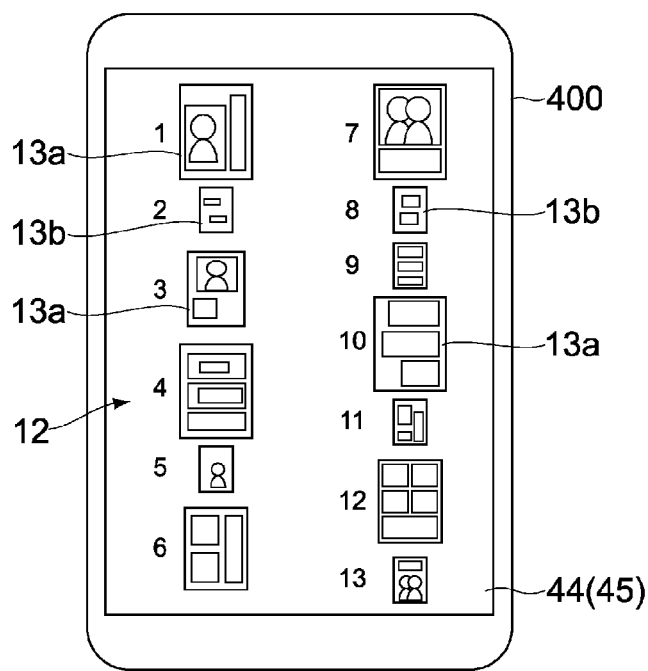
[FIG. 13] A diagram showing a display example of a page thumbnail in the embodiment of the present invention.

FIG. 13 is a diagram showing a display example of the thumbnails. As shown in FIG. 13, when displaying a thumbnail list 12, the CPU 41 enlarges a thumbnail 13a of a page that has been displayed in accordance with the number of display times and a display time period, and displays a thumbnail 13b of a page that has not been displayed in a normal size.

As described above, the enlarged thumbnails are displayed in accordance with the display histories, with the result that a user can find a page that the user has browsed before with ease while distinguishing it from a page that the user has not yet browsed.

Though the size of the thumbnail is changed in accordance with the display history, a size of a page may be changed in accordance with contents of each page. For example, the CPU 41 may enlarge a thumbnail of each page that matches a theme set in advance by the user or the like in accordance with a matching ratio (similarity) or a size etc. of an article included in the page. That is, the CPU 41 can improve convenience of the user by changing the size of a thumbnail in accordance with whether a predetermined condition is satisfied or not.

Here, the display history may be acquired from the ECG server 200. The display history in this case may include not only the display history in the receiving terminal 400 but also a display history of a client apparatus of the user other than the receiving terminal 400. Accordingly, even when the user uses a book ECG unit 1 and a page thumbnail in an apparatus other than the receiving terminal 400, the receiving terminal 400 can share display histories in respective apparatuses to thereby reflect the display histories on the page thumbnails.

(Display Processing of Bookshelf Using Book ECG Units)

Figure 14:
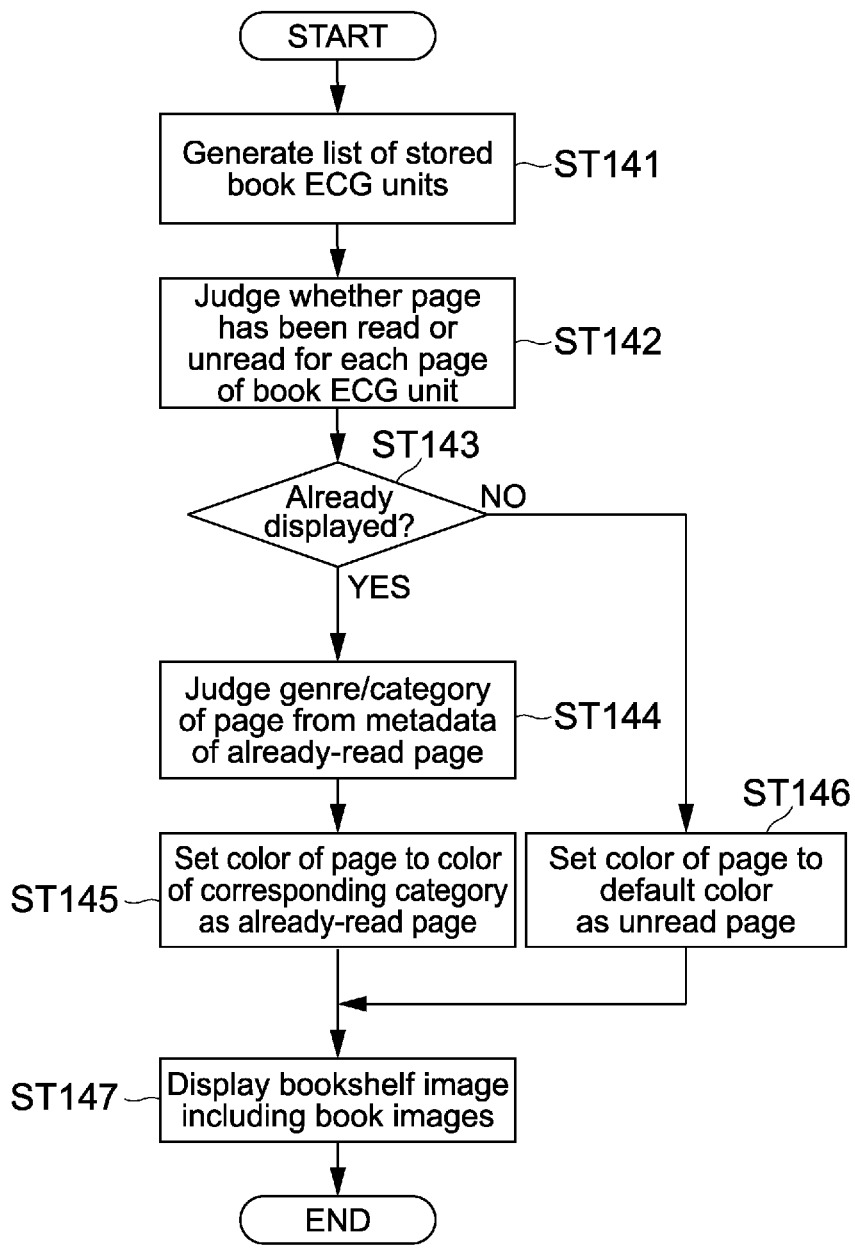
[FIG. 14] A flowchart showing a flow of display processing of a bookshelf image by the receiving terminal according to the embodiment of the present invention.

In this embodiment, the receiving terminal 400 can present a user a list of book ECG units 1 stored in the receiving terminal 400 as an image representing a bookshelf (bookshelf image). Further, when the bookshelf image is displayed, the receiving terminal 400 can reflect display histories of respective pages of the book ECG units 1 on the display. Hereinafter, this bookshelf display processing will be described. FIG. 14 is a flowchart showing a flow of the bookshelf display processing by the receiving terminal 400.

As shown in FIG. 14, the CPU 41 generates a list of book ECG units 1 that are stored in the flash memory 43 or the like and possessed by the user (Step 141). Subsequently, the CPU 41 judges, for each page of the book ECG units 1, whether that page has been displayed before based on the display history (Step 142).

In a case where it is judged that the page as a judgment target has been displayed (YES in Step 143), the CPU 41 acquires page metadata of that page and judges a genre and category of that page based on the page metadata (Step 144).

Then, the CPU 41 sets, as an already-read page, a color of that page to be a color corresponding to the judged genre and category (Step 145).

Further, when judging that the page as the judgment target has not been displayed (NO in Step 143), the CPU 41 sets the color of that page to be a default color as an unread page (Step 146).

Then, the CPU 41 repeats the above processing for the respective pages of the book ECG units 1 and displays a bookshelf image including book images in which the respective pages of the book ECG units 1 are expressed in the set colors, on the display 44 (Step 147).

Figure 15:
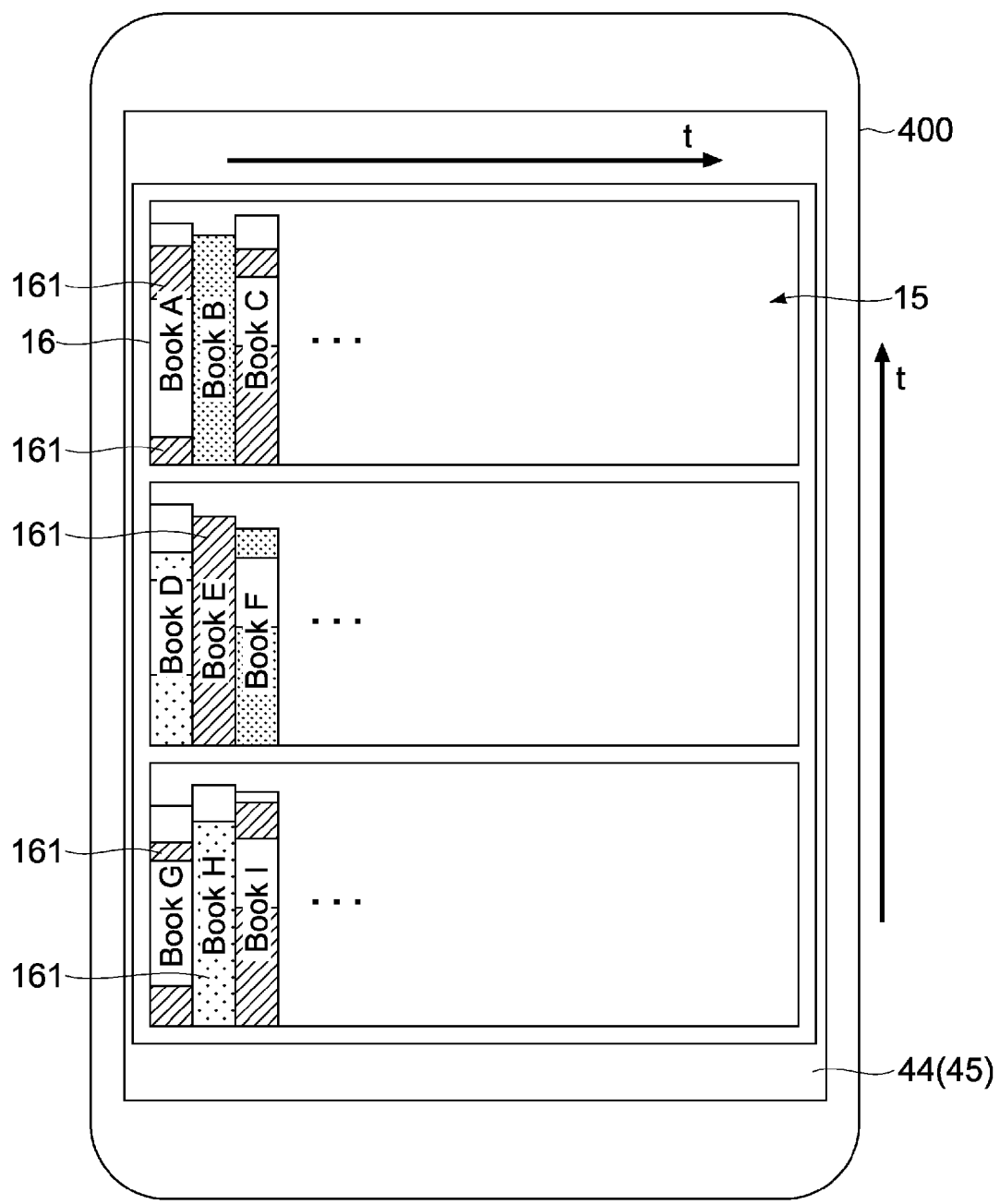
[FIG. 15] A diagram showing a display example of the bookshelf image in the embodiment of the present invention.

FIG. 15 is a diagram showing a display example of the bookshelf image. As shown in FIG. 15, a bookshelf image 15 includes book images 16 each indicating the book ECG unit 1 stored in the receiving terminal 400. In the book image 16, an already-read page portion 161 described above is displayed in a color different from that of an unread page portion. In addition, the already-read page portion 161 is displayed in different colors depending on a genre and category thereof. The respective pages are colored according to genres thereof such that fashion-associated information is colored in red and technology-associated information is colored in blue, for example. As to a book ECG unit 1 in which all pages are already read, an entire surface of a book image thereof is colored.

As shown in FIG. 15, the bookshelf having book images arranged therein is constituted of a plurality of shelves. On each shelf, a display date and time of each book ECG unit 1 is reflected on the display of the book images 16. For example, on one shelf, book images of the book ECG units 1 are displayed in a chronological order of the display dates and times from the left-hand side to the right-hand side in FIG. 15. Moreover, display dates and times of the book ECG units 1 become later toward the top in FIG. 15. Regarding the display date and time of the book ECG unit 1 that has been displayed a plurality of times, any of the first display date and time, the last display date and time, and a display date and time therebetween may be used. Further, the book images 16 may be displayed such that the plurality of display dates and times can be each checked in the already-read page portion 161.

Here, each shelf may represent a period to which the display dates and times belong. For example, book images of book ECG units 1 that have been displayed that year are displayed on the top shelf of FIG. 15, and book images of book ECG units 1 that have been displayed the previous year are displayed on the next shelf of FIG. 15. Other shelves representing periods that are unable to be displayed on the display 44 may be displayed by scrolling. Further, the receiving terminal 400 may display information on events that have occurred in the society during those periods, for each period corresponding to each shelf. Accordingly, the user can recall details of the periods in addition to the reading trend of his/her own for each period.

Further, the shelves may be differentiated by genres of the book ECG units 1. For example, book images of book ECG units 1 in a genre of magazines may be displayed on the top shelf of FIG. 15, and book images of book ECG units 1 in a genre of technical books may be displayed on the next shelf of FIG. 15.

As described above, by presenting a list of book ECG units 1 as the bookshelf image 15, the receiving terminal 400 can not only attract more interests of the user, but also enable the user to grasp an already-read page/unread page of the book ECG unit 1 and a genre and category thereof with ease. The user can utilize the bookshelf image 15 to make a reading plan for the future.

Here, the display history may be acquired from the ECG server 200 as described above and may include a display history of a book ECG unit 1 in a client apparatus other than the receiving terminal 400 that the user uses. By sharing display histories of other apparatuses, the receiving terminal 400 can generate a bookshelf image 15 by also reflecting the display histories of other apparatuses. Thus, the user can grasp the display histories in the respective apparatuses at the same time.

(Processing of Adding Recommended Book)

Figure 16:
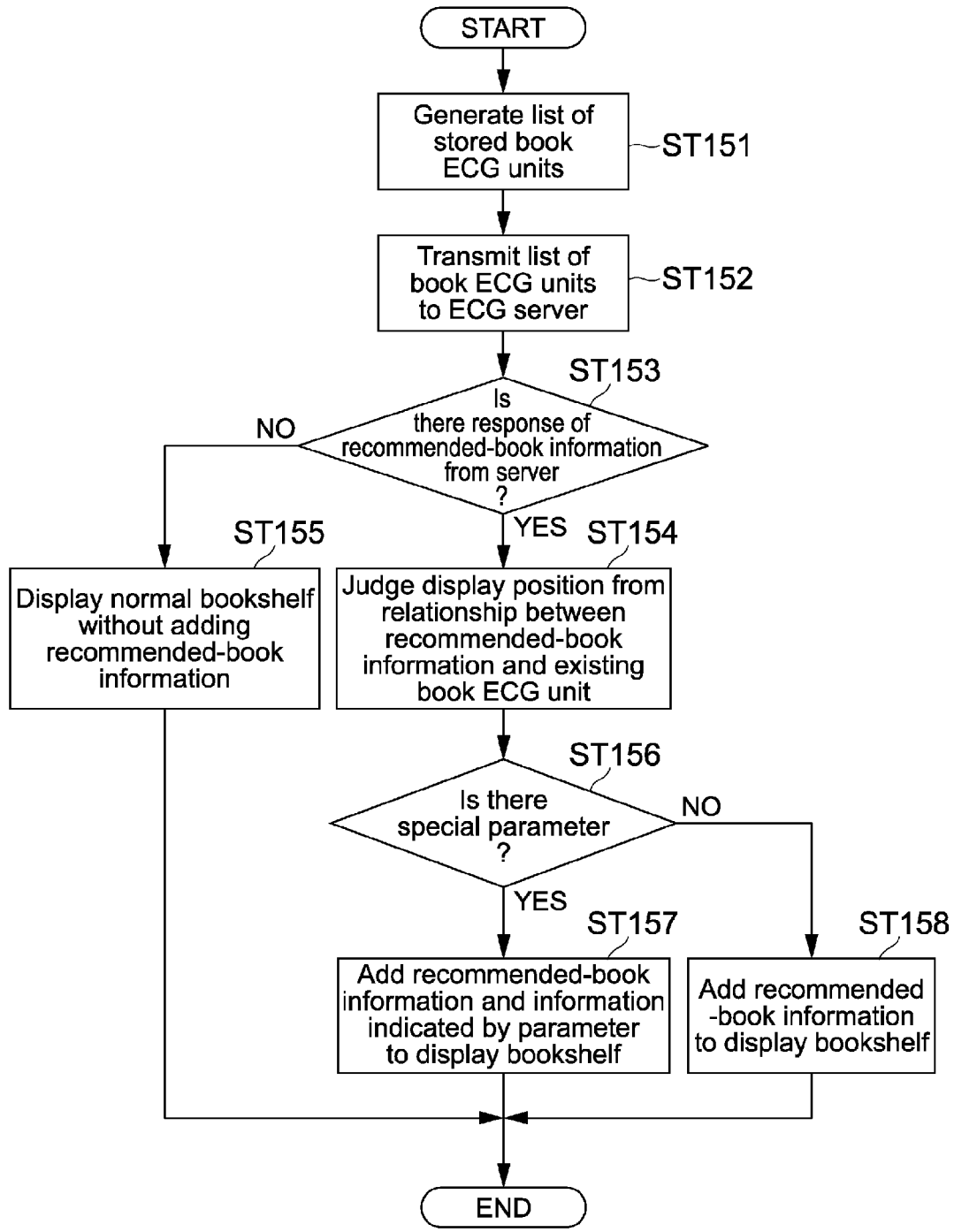
[FIG. 16] A flowchart showing a flow of processing of adding a recommended book to the bookshelf image by the receiving terminal according to the embodiment of the present invention.

The bookshelf image 15 has a variety of view modes. For example, a book ECG unit 1 that is not stored in the receiving terminal 400 may be added to the bookshelf image 15 as a recommended book. FIG. 16 is a flowchart showing a flow of processing of adding a recommended book to the bookshelf image 15.

As shown in FIG. 16, the CPU 41 generates a list of book ECG units 1 stored in the flash memory 43 (Step 151) and transmits the list to the ECG server 200 (Step 152).

The ECG server 200 that has received the list retrieves book ECG units 1 that are not included in the generated list of book ECG units 1 and transmits a list of the retrieved book ECG units 1 to the receiving terminal 400 as recommended-book information.

The CPU 41 judges whether there has been a response of recommended-book information from the ECG server 200 (Step 153). In a case where there is no response of the recommended-book information from the ECG server 200 (NO), the CPU 41 displays a normal bookshelf image 15 without adding the recommended-book information (Step 155).

In a case where there has been a response of the recommended-book information from the ECG server 200 (YES), the CPU 41 compares book metadata of the book ECG units 1 included in the recommended-book information and book metadata of the book ECG units 1 already included in the bookshelf image 15 and judges display positions thereof (Step 154). For example, the CPU 41 determines display positions so that a recommended book is displayed next to a book image of a book ECG unit 1 in a genre that is the same as or similar to that of the book ECG unit 1 included in the recommended-book information.

Subsequently, the CPU 41 judges whether a special parameter is included in the recommended-book information (Step 156). Here, the special parameter refers to, for example, information as to whether the book ECG unit 1 included in the recommended-book information can be purchased, from when the book ECG unit 1 can be purchased, and the like.

In a case where a special parameter is included (YES), the CPU 41 adds the recommended-book information to the list for generating the bookshelf image 15, adds information indicated by the parameter thereto, and displays the resultant as a new book image 16 in the bookshelf image 15 (Step 157).

In a case where a special parameter is not included (NO), the CPU 41 adds the recommended-book information to the list for generating the bookshelf image 15 and displays the resultant as it is as a new book image 16 in the bookshelf image 15 (Step 158).

Figure 17:
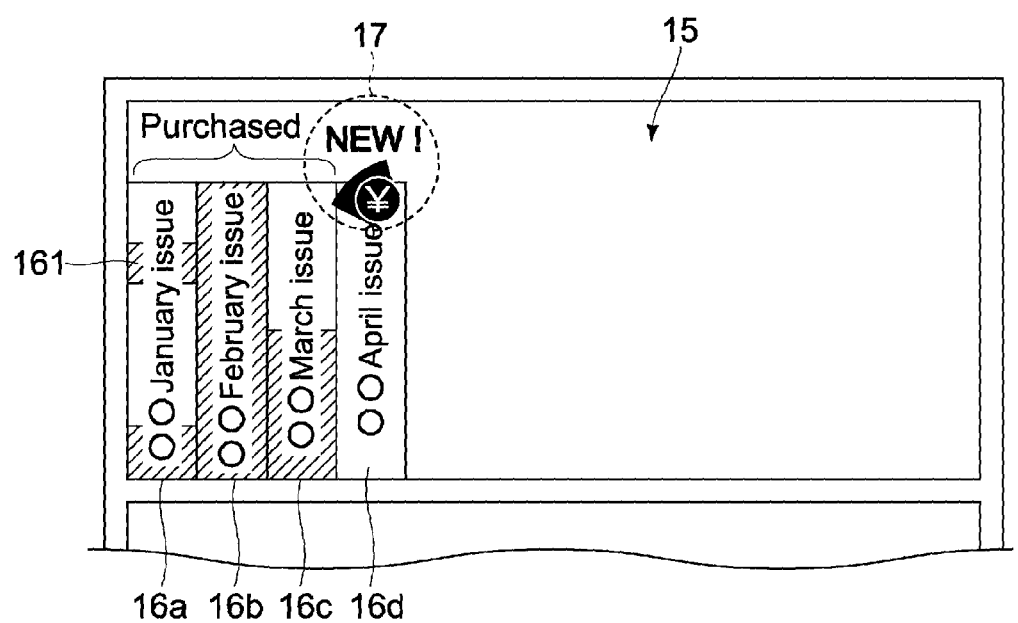
[FIG. 17] A diagram showing a display example in a case where a recommended book is added to the bookshelf image in the embodiment of the present invention.

FIG. 17 is a diagram showing a state where the recommended book is added to the bookshelf image 15. As shown in FIG. 17, a new book image 16d is added next to three book images 16a to 16c as the recommended-book information. For example, in a case where book ECG units 1 of the January to March issues of a monthly magazine are purchased and stored, a book image 16d indicating the April issue is added next to the book images 16a to 16c indicating the January to March issues as the recommended-book information.

Displayed in the book image 16d is an icon 17 indicating that that recommended book is newly released and is purchasable. For example, when the user inputs an operation of designating the icon 17, settlement processing of the recommended book is executed.

As described above, instead of merely presenting a recommended book to a user, the receiving terminal 400 presents a new book ECG unit 1 by adding a recommended book to the bookshelf image 15, with the result that it is possible to evoke a consumer appetite while attracting more interests of the user.

In the example of FIGS. 16 and 17, the receiving terminal 400 transmits the list of the book ECG units 1 to the ECG server 200. Alternatively, the receiving terminal 400 may transmit user's preference information that is analyzed from the list. In this case, the ECG server 200 retrieves a recommended book based on the received preference information and sends back recommended-book information.

Further, in a case where a recommended book added to the bookshelf image 15 is purchased, a user may be allowed to enjoy some merits like the user is able to purchase the recommended book earlier or at a lower price than in a case of purchasing the book at another EC site or bookstore.

Moreover, regarding a periodical publication as shown in FIG. 17, the user of the receiving terminal 400 may subscribe through the ECG service provider or publisher so that a subsequent issue is periodically added to the bookshelf image 15. In this case, the receiving terminal 400 may display, prior to a sales date of a next issue, a book image of that book ECG unit 1 to be released in the bookshelf image 15 in a form of translucent display or the like together with scheduled sales date information, and change the display form to a normal display form on the sales date so that the book ECG unit 1 can be browsed. Accordingly, by providing the user with information on a book to be released, the receiving terminal 400 can give the user joy in looking forward to the sales date.

In addition, regarding book ECG units 1 whose volumes have been all published, such as complete works and comic books, the ECG server 200 may provide some special benefits to the user when the user purchases all the volumes via the receiving terminal 400. For example, the ECG server 200 may provide a moving image associated with the book, a ticket of an associated movie, or the like to the user of the receiving terminal 400 when all the volumes are collected (when final issue (volume) is added to bookshelf image 15). The moving image, ticket information, and the like are provided to the receiving terminal 400 as part of the associated information stored in the ECG server 200.

(Other View Modes in Bookshelf)

The receiving terminal 400 can also sort out the book images 16 within the bookshelf image 15 or separate them by genres with the use of the book metadata of the book ECG units 1. In the case of the separation by genres, the receiving terminal 400 may use the shelves of the bookshelf image 15 as a unit of the separation. Further, the shelves of the bookshelf image 15 may be used as a unit of various separations according to various items that can be added based on the book metadata, the examples of which include an author, a publisher, a magazine (in a case of book etc.), a read/unread book, a frequency of browsing, and a theme, in addition to the genre.

Further, the receiving terminal 400 may change the display mode of the bookshelf itself of the bookshelf image 15 by using the book metadata of the book ECG unit 1. For example, based on the book metadata of the book ECG units 1 stored in the flash memory 43, the receiving terminal 400 may judge a genre of the book ECG units 1 that dominates a highest ratio and express the bookshelf in accordance with that genre. More specifically, the receiving terminal 400 may personify the bookshelf like a concierge (character) and change a face or clothes of the character into those of an athlete when a ratio of sport magazines is high, change them into those of a business person when a ratio of business books is high, change them into those of a scholar when a ratio of academic books is high, etc. In addition, the receiving terminal 400 may store a plurality of patterns (skins) of the bookshelf and make the user select a desired pattern to express the bookshelf image 15.

Further, the receiving terminal 400 may collectively display the book ECG units 1 constituted of a plurality of volumes (issues) such as periodical publications, comics, and complete works, as a single book on the bookshelf image 15. In this case, the receiving terminal 400 may control display so that the book ECG unit 1 of each issue (volume) is displayed in a case where the collectively-displayed books are selected by the user.

Further, in a case where the receiving terminal 400 is used by a plurality of users, the receiving terminal 400 may display the bookshelf image 15 for each user. Moreover, the receiving terminal 400 may prepare a secret bookshelf (or space) for each user in a bookshelf shared by the plurality of users. That is, the receiving terminal 400 may be set so that the secret bookshelf is inaccessible without passing authentication processing.

(Bookshelf Sharing Processing with Other Receiving Terminals)

Figure 18:
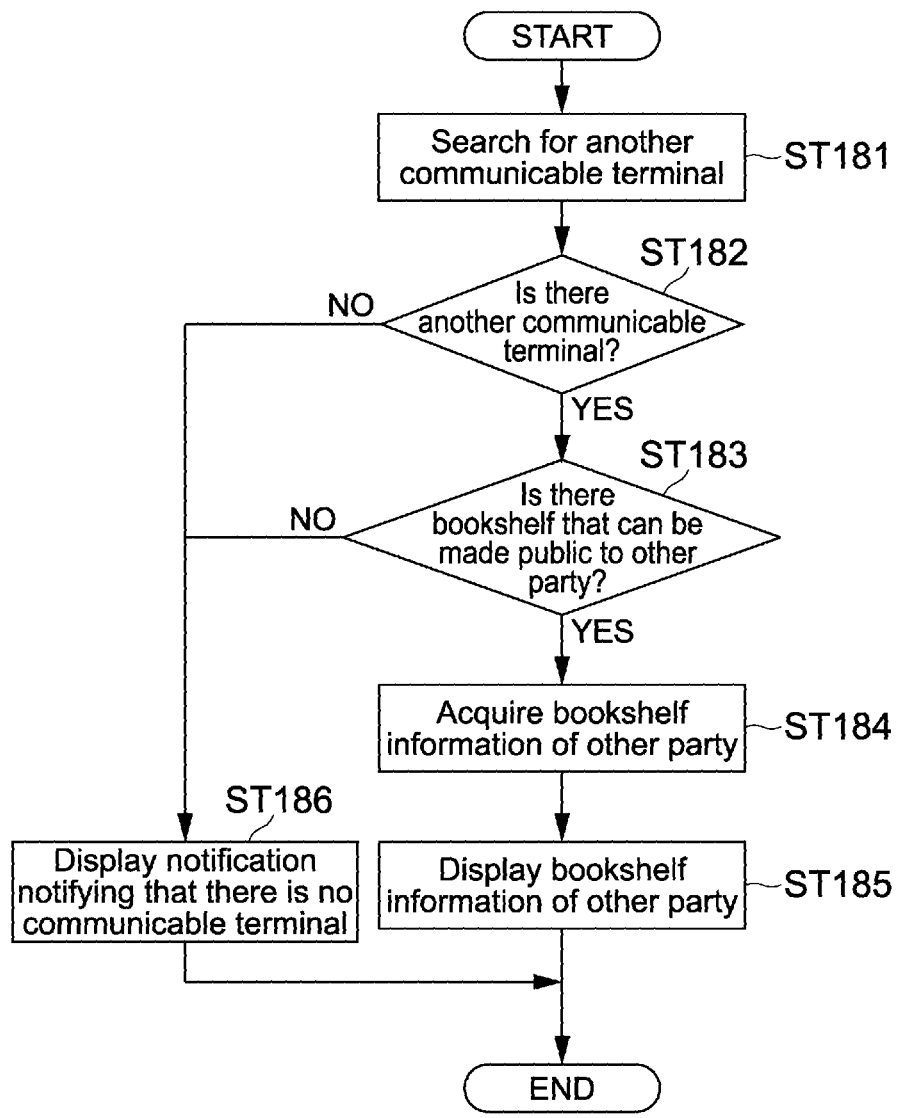
[FIG. 18] A flowchart showing a flow of sharing processing of bookshelf information of another receiving terminal by the receiving terminal according to the embodiment of the present invention.

In this embodiment, the receiving terminal 400 can also share the book ECG units 1 represented as the bookshelf image 15 with another receiving terminal 400. FIG. 18 is a flowchart showing a flow of the bookshelf sharing processing.

As shown in FIG. 18, when a user instructs the bookshelf sharing processing with another receiving terminal 400, the CPU 41 first searches for another receiving terminal 400 that is communicable by the communication section 29 (Step 181). For example, the CPU 41 judges whether there is another receiving terminal 400 that is connectable by a wireless LAN within a predetermined distance range, for example.

If it is judged that there is another communicable receiving terminal 400 (YES in Step 182), the CPU 41 judges whether the other receiving terminal 400 has a bookshelf that can be made public (book ECG units 1) (Step 183). This judgment is performed by the CPU 41 transmitting a request to make a bookshelf public to the other receiving terminal 400 and receiving a response to permit the bookshelf to be made public from the other receiving terminal 400, for example. Further, in a case where the receiving terminal 400 and the other receiving terminal 400 exchange condition information on the sharing (making bookshelf public) in advance, the CPU 41 may judge whether the bookshelf can be made public according to the condition information. In a case where the condition information is set, the user may be allowed to set whether to make the bookshelf public or not for each of his/her own book ECG units 1.

If it is judged that there is no other communicable receiving terminal 400 (NO in Step 182) or a response to permit the bookshelf to be made public is not obtained though there is another communicable receiving terminal 400 (NO in Step 183), the CPU 41 notifies to that effect through the display 44 (Step 186).

Hereinafter, for convenience of description, the receiving terminal 400 concerned is referred to as receiving terminal 400a, and the other receiving terminal 400 is referred to as receiving terminal 400b.

In a case where a response to permit the bookshelf to be made public is obtained from the receiving terminal 400b (YES in Step 183), the CPU 41 acquires bookshelf information of the receiving terminal 400b (list of book ECG units 1) (Step 184). Based on the bookshelf information, the CPU 41 then displays a bookshelf image 15 of the receiving terminal 400b as the bookshelf image 15 together with the book ECG units 1 stored in the receiving terminal 400a (Step 185). In this case, the CPU 41 expresses book images 16 in the bookshelf image 15 so that the book ECG units 1 possessed by the user of the receiving terminal 400a and the book ECG units 1 possessed by the user of the receiving terminal 400b are distinguishable.

In this case, in accordance with the operation of the user, the CPU 41 may execute processing for purchasing/selling or borrowing/lending the book ECG unit 1 belonging to the shared bookshelf with respect to the user of the receiving terminal 400b. When the purchasing/selling processing or borrowing/lending processing is executed, the ECG server 200 may execute intermediate processing.

In a case where the purchasing/selling of the book ECG unit 1 is performed with the receiving terminal 400b, though a price thereof can of course be set by the user on the selling side, the CPU 41 may judge the value thereof automatically and set the price based on a publication date of each book ECG unit 1. For example, in a case where a book ECG unit 1 to be purchased/sold has been originally sold for a limited time only that has already expired, the CPU 41 may set the price of the book ECG unit 1 to be high. Conversely, the CPU 41 may set a low price for a book ECG unit 1 that is not sold for a limited time and distributed in large quantities on the electronic book providing system. The CPU 41 can judge the publication date, the presence/absence of the sales for a limited time, and the like based on the book metadata.

In a case where the book ECG unit 1 is borrowed/lent from/to the receiving terminal 400b, the CPU 41 may automatically set a price not only by a user setting but also by an automatic setting in accordance with a rental period. Further, regarding the book ECG unit 1 that is borrowed from the user of the receiving terminal 400b, the CPU 41 may automatically delete a book image of the book ECG unit 1 of the rental target from the bookshelf image 15 of the receiving terminal 400a as a borrower when a due date of return has come. Accordingly, it is possible to prevent the lent book ECG unit 1 of the receiving terminal 400b from not being returned even after the due date.

In a case where the bookshelf is shared with the receiving terminal 400b, the CPU 41 may allow the user of the receiving terminal 400a to input a comment directed to the user of the receiving terminal 400b, that is related to the book ECG unit 1 possessed by the user of the receiving terminal 400b. Conversely, in a case where the receiving terminal 400a makes the bookshelf public to the receiving terminal 400b, the CPU 41 may allow the user of the receiving terminal 400a to add a comment on his/her own recommended book ECG unit 1.

Further, in a case where the bookshelf image 15 of the receiving terminal 400a is made public, the book ECG unit 1 that has been made public may be displayed so as to be purchasable from an EC agent instead of the receiving terminal 400a. For example, the user of the receiving terminal 400b may browse the book ECG units 1 in a bookshelf that has been made public by the user of the receiving terminal 400a and comments on the book ECG units 1 and execute settlement processing for purchasing a desired book ECG unit 1 with respect to the EC agent. In this case, a system in which the user of the receiving terminal 400a functions as an affiliate user and receives a reward from the EC agent in accordance with sales of a user of another receiving terminal 400 such as the receiving terminal 400b may be executed.

Summary

As described above, according to this embodiment, the ECG server 200 adds various types of metadata to information items or the like of an electronic book, and provides the resultant to the receiving terminal 400 as the book ECG unit 1. Accordingly, a user of the receiving terminal 400 can browse not only the electronic book itself but also various types of associated information with the electronic book as a starting point based on the various types of metadata.

Further, the receiving terminal 400 can express the book ECG units 1 that the receiving terminal 400 itself stores as the bookshelf image 15, and change a display mode of the bookshelf image 15 or execute the processing of adding recommended books, the sharing processing with another receiving terminal 400, and the like. Accordingly, the receiving terminal 400 can lead the user to various pieces of information with the bookshelf image 15 as a starting point.

MODIFIED EXAMPLE

The present invention is not limited to the embodiment described above and can be variously modified without departing from the gist of the present invention.

In the embodiment described above, the ECG server 200 basically generates the book ECG unit 1 according to the order of the pages of the electronic book. However, the ECG server 200 may incorporate a plurality of electronic books in a single book ECG unit 1 and provide the pages to the receiving terminal 400 after rearranging (shuffling) the pages of the electronic books at random. Moreover, the pages may be set to be shuffled automatically each time the book ECG unit 1 is reproduced in the receiving terminal 400. In this case, it is also possible to shuffle and display only unread pages in the receiving terminal 400.

Further, the pages may be shuffled not only in a page unit but also in a page group unit. In this case, when a plurality of columns constituted of a plurality of pages are present as page groups, an order of displaying those columns may be changed at random.

Furthermore, without being limited to the case of the rearrangement at random, the ECG server 200 may acquire user's preference information on a category, a theme, a particular person, a particular product, etc. and rearrange a plurality of pages or page groups in an order corresponding to the preference information.

In other words, a single book ECG unit 1 may be generated so that pages or pages groups of a plurality of electronic books are displayed in an order based on a predetermined rule.

In a case where advertisement information is included in the book ECG unit 1, the ECG server 200 may make a setting so that the advertisement information changes in accordance with the preference of the user of the receiving terminal 400. For example, the preference information of the user may be transmitted to the ECG server 200 from the receiving terminal 400, and the ECG server 200 may extract only advertisement information matching the preference of the user and replace an advertisement page of the existing electronic book by the extracted advertisement information to thereby generate a book ECG unit 1. Moreover, the ECG server 200 may add metadata so that the advertisement pages are shuffled each time the book ECG unit 1 is displayed.

The receiving terminal 400 may pick up a page that the user likes out of pages of the book ECG unit 1 and store the page as a binder. Whether the page is a page that the user likes or not may be determined by an operation of the user, or may be automatically judged by the receiving terminal 400 based on a display time or the like.

In the embodiment described above, the various view modes of the bookshelf image 15 have been described. However, the view mode is not limited to those above described. For example, the receiving terminal 400 may express the bookshelf image 15 while seeing a map as a bookshelf based on location information associated with book ECG units 1.

Figure 19:
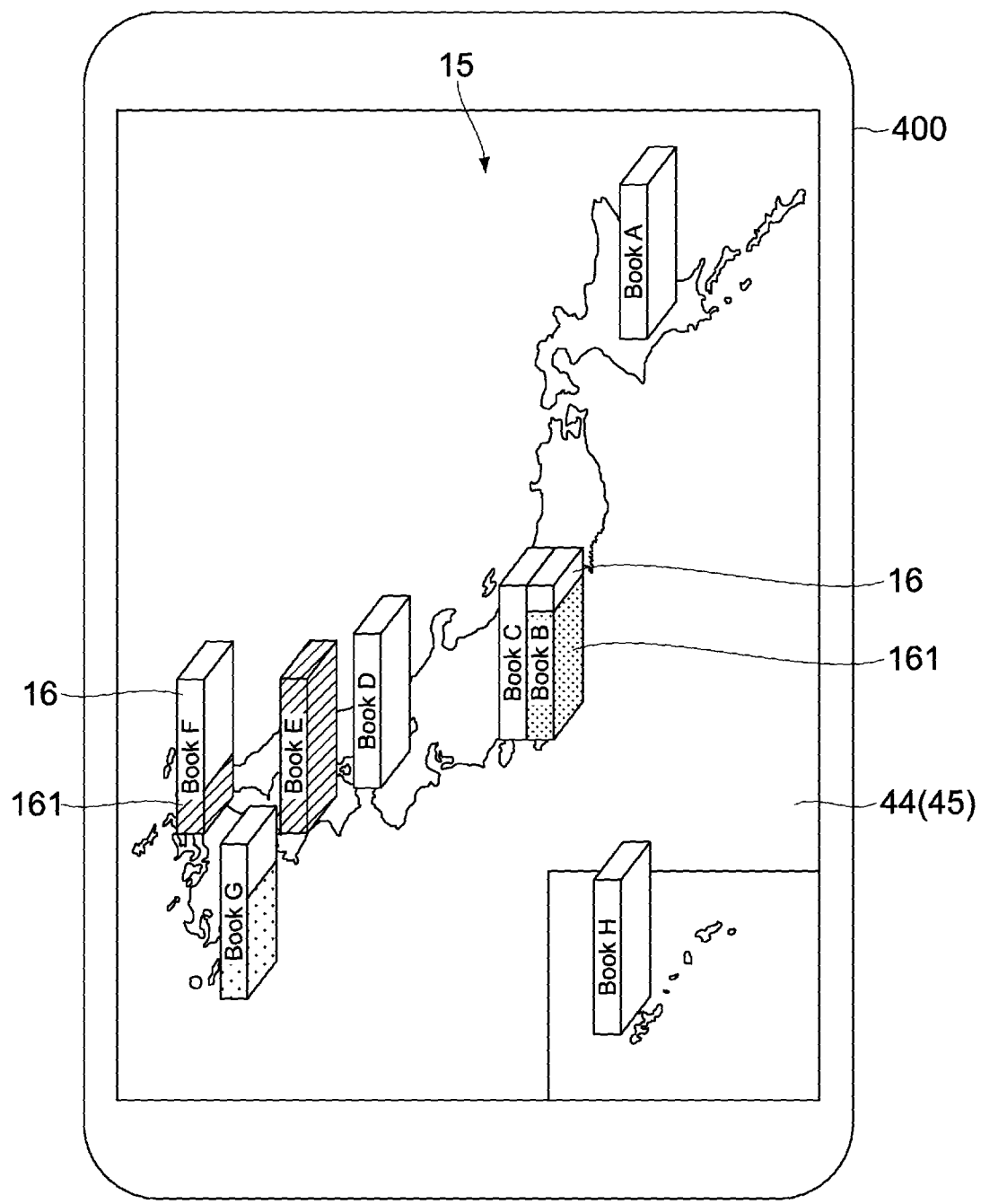
[FIG. 19] A diagram showing a display example of a bookshelf image in another embodiment of the present invention.

FIG. 19 is a diagram showing an example of the bookshelf image 15 in a case where a bookshelf is represented as a map as described above. As shown in FIG. 19, for example, the receiving terminal 400 sees a map of Japan as a bookshelf and arranges book images 16 on the map of Japan in accordance with location information associated with the book ECG units 1. In this case, the receiving terminal 400 only needs to store map information of the map of Japan and information on areas on the map in the flash memory 43 or the like, and determine the positions to arrange the book images 16 from the location information included in the book metadata of each book ECG unit 1. Of course, the map is not limited to a map of Japan, and a world map, a map of a county or area other than Japan, or a map of each prefecture or area of Japan may be represented as the bookshelf image 15.

In the embodiment described above, the operation to the book ECG unit 1 in the receiving terminal 400 is detected from the touch panel, but the operation may instead be detected based on an input from another input device such as a mouse, a keyboard, a key, a switch, and a touch pad.

In the embodiment described above, a magazine has been taken as an example of the book ECG unit 1. However, various types of electronic books such as a novel, a comic, a dictionary, a thesaurus, a picture book, a photo book, a poetry book, an art collection book, a technical book, a map, and a brochure or contents obtained by digitizing printed media such as a leaflet and a card are similarly provided as the book ECG unit 1.

In the embodiment described above, the receiving terminal 400 has been applied as an electronic apparatus. However, the present invention is applicable to various electronic apparatuses such as a PC, a cellular phone, a smartphone, a PDA, a portable music/video player, an electronic dictionary, and other AV (Audio/Visual) apparatuses.

The present application contains subject matter related to that disclosed in Japanese Priority Patent Application JP 2009-112125 filed in the Japan Patent Office on May 1, 2009, the entire content of which is hereby incorporated by reference.

REFERENCE SIGNS LIST

1 book ECG unit
10 network
12 thumbnail list
13 (13*a*, 13*b*) thumbnail
15 bookshelf image
16 (16*a* to 16*d*) book image
21, 41 CPU
29, 46 communication section
31, 41 CPU
43 flash memory
44 display
45 touch panel
91 associated information
100 publisher server
161 already-read page portion
200 ECG server
210 book ECG registration system
220 book ECG management system
230 book ECG providing system
240 book ECG distribution system
400 (400*a*, 400*b*) receiving terminal

The invention claimed is:

1. A server apparatus, comprising:
    a memory;
    circuitry configured to
        store, in a storage, an electronic book obtained by digitizing a book having at least one page in which at least one information item is represented, and associated information that is associated with the at least one information item,
        communicate with an external electronic apparatus,
        generate, in the server apparatus, an electronic book unit by adding first metadata to an information item of the electronic book stored in the storage, the first metadata associating the associated information with the information item, and
        control communication of the generated electronic book unit to the external electronic apparatus,
    wherein each page is organized in a hierarchical structure including a plurality of hierarchical levels, each level of the hierarchical structure including metadata associated therewith, and
        when the electronic book is displayed by the external electronic apparatus and the information item including the first metadata is designated in the electronic book at the external electronic apparatus, the circuitry transmits the associated information associated with the first metadata to the external electronic apparatus, and when a user enters an indication into the external electronic apparatus that the user is interested in a page of the electronic book, the external electronic apparatus performs a search for content based on metadata associated with each hierarchical level in the page.

2. The server apparatus according to claim 1,
    the circuitry receives designation information that indicates designation of the information item from the external electronic apparatus, and
    the circuitry extracts the associated information from the storage based on the first metadata corresponding to the designated information item that is indicated by the received designation information, and controls transmission of the extracted associated information to the external electronic apparatus.

3. The server apparatus according to claim 1,
    wherein plural information items exist in one page of the electronic book, and
    the circuitry adds the first metadata to each of points at which, out of the plurality of information items, a first information item and a second information item that have a predetermined association are represented, so that a display area of the electronic book unit is movable with the points as a reference in the external electronic apparatus.

4. The server apparatus according to claim 1,
    wherein the electronic book includes a plurality of page groups each including at least one page, and
    wherein the circuitry adds second metadata indicating information on a page group to the electronic book so that when a first operation is input in the external electronic apparatus, a page displayed in the electronic book unit moves to a next page to be displayed, and when a second operation is input in the external electronic apparatus, the page displayed in the electronic book unit moves to another page of a page group that is different from a page group to which the page belongs, and is then displayed.

5. The server apparatus according to claim 1,
    wherein the electronic book includes a plurality of pages,
    wherein the circuitry stores a plurality of pairs of the electronic book and the first metadata in association with each other in the storage, and
    the circuitry adds the first metadata to each of the information items in the plurality of pages of the plurality of electronic books, and generates the electronic book unit so that the plurality of pages of the plurality of electronic books are displayed in an order based on a predetermined rule at predetermined time intervals, irrespective of an order of the plurality of pages.

6. An electronic apparatus, comprising:
a memory;
circuitry configured to
  store, in a storage, an electronic book unit including an electronic book obtained by digitizing a book having at least one page in which at least one information item is represented and first metadata that is set for the at least one information item, the at least one page being organized in a hierarchical structure including a plurality of hierarchical levels, each level of the hierarchical structure including metadata associated therewith,
  display the electronic book unit on a display,
  detect an operation of designating an information item included in the electronic book, the operation being made by a user on the displayed electronic book unit, and
  receive from a server apparatus, when the operation of designating the information item is detected, associated information that is associated with the designated information item based on the first metadata set for the designated information item and to control display of the associated information associated with the designated information item, and when a user enters an indication that the user is interested in a page of the electronic book, the circuitry performs a search for content based on metadata associated with each hierarchical level in the page.

7. The electronic apparatus according to claim 6,
wherein plural information items exist in one page of the electronic book,
wherein the display includes a predetermined display area,
wherein the first metadata is added to each of points at which, out of the plurality of information items of the electronic book unit, a first information item and a second information item that have a predetermined association are represented, and
wherein the circuitry controls the display so that one of the first information item and the second information item is displayed with each of the points as a center of the display area, and the first information item and the second information item out of the plurality of information items are successively displayed with the points as a reference.

8. The electronic apparatus according to claim 6,
wherein the electronic book includes a plurality of page groups each including at least one page,
wherein the electronic book unit is added with second metadata indicating information on the page groups, and
wherein the circuitry controls, based on the second metadata, the display so that when a first operation of a user is detected by the detector, a page displayed in the electronic book unit moves to a next page to be displayed, and when a second operation of the user is detected by the detector, the page displayed in the electronic book unit moves to another page of a page group that is different from a page group to which the page belongs, and is then displayed.

9. The electronic apparatus according to claim 8,
wherein the second operation includes a third operation and a fourth operation,
wherein the storage stores a plurality of the electronic book units including the first metadata and the second metadata,
wherein the circuitry controls the display so that when the third operation is input in the electronic apparatus, the page displayed in the electronic book unit moves to a first page of a page group subsequent to the page group to which the page belongs, and is then displayed, and
wherein when the fourth operation is input in the electronic apparatus, the circuitry controls the display so that the page displayed in the electronic book unit moves to a first page of one of another page group of the electronic book unit and a page group of another electronic book unit stored in the storage, the page groups being associated with the first metadata added to the information item of the displayed page, and is then displayed.

10. The electronic apparatus according to claim 6,
wherein the electronic book includes a plurality of pages,
wherein the storage stores condition information of a case where the plurality of pages of the electronic book unit are displayed as a list, and
wherein the circuitry controls the display to display the plurality of pages as a list so that out of the plurality of pages of the electronic book unit, a page matching the condition information is distinguishable from the other pages.

11. The electronic apparatus according to claim 6,
wherein the storage stores a plurality of the electronic book units and a display history of each page of each electronic book unit, and
wherein the circuitry generates a bookshelf image so that book images respectively indicating the plurality of electronic book units are arranged to be selectable by the user based on the display histories, and out of the pages of the electronic book units, pages that have been displayed and the other pages that have not been displayed are visually distinguishable within the book images, and controls the display to display the bookshelf image.

12. The electronic apparatus according to claim 11,
wherein each of the plurality of electronic book units is added with second metadata indicating an attribute of each of the pages of the electronic book units, and
wherein the circuitry generates the bookshelf image so that the attribute of the page that has been displayed is visually distinguishable within the book images in the bookshelf image based on the second metadata.

13. The electronic apparatus according to claim 11,
wherein each of the plurality of electronic book units is added with second metadata indicating location information on a location associated with each of the electronic book units,
wherein the storage stores map information of a predetermined area, and
wherein the circuitry generates the bookshelf image so that the book images are arranged in accordance with the second metadata on the map information.

14. The electronic apparatus according to claim 11,
wherein the circuitry is further configured to communicate with an external server apparatus,
  the circuitry controls transmission of information on the plurality of electronic book units stored in the storage to the external server apparatus and receives, from the external server apparatus, another electronic book unit associated with the plurality of stored electronic book units, and
  the circuitry updates the bookshelf image so that a book image indicating the received electronic book unit is arranged to be distinguishable from the book images included in the displayed bookshelf image.

15. The electronic apparatus according to claim 11, wherein the circuitry is further configured to communicate with an external electronic apparatus, and the circuitry controls one of a reception of a bookshelf image of an electronic book unit stored in the external electronic apparatus from the external electronic apparatus, and transmission of the bookshelf image of the plurality of electronic book units stored in the storage to the external electronic apparatus, and controls the display to display the received bookshelf image.

16. An electronic book providing system, comprising:

a memory;

a server apparatus including first circuitry configured to
store, in a first storage, an electronic book obtained by digitizing a book constituted of at least one page in which at least one information item is represented, and associated information that is associated with the at least one information item, and generate in the server apparatus an electronic book unit by adding first metadata to an information item of the electronic book stored in the first storage, the first metadata associating the associated information with the information item and control the first communication section to transmit the generated electronic book unit, each page in the book being organized in a hierarchical structure including a plurality of hierarchical levels, each level of the hierarchical structure including metadata associated therewith; and an electronic apparatus including second circuitry configured to receive the transmitted electronic book unit, store, in a second storage, the received electronic book unit, display the stored electronic book unit on a display, detect an operation of designating the information item of the electronic book, the operation being made by a user on the displayed electronic book unit, and receive from the server apparatus, when the operation of designating the information item is detected, the associated information that is associated with the information item, based on the first metadata added to the information item in the server apparatus and control the display to display the associated information associated with the information item, and when a user enters an indication that the user is interested in a page of the electronic book, the second circuitry performs a search for content based on metadata associated with each hierarchical level in the page.

17. An electronic book providing method, comprising:

storing, with circuitry, an electronic book obtained by digitizing a book having at least one page in which at least one information item is represented, and associated information that is associated with the at least one information item;

generating, with the circuitry, an electronic book unit by adding metadata to an information item of the stored electronic book, the first metadata associating the associated information with the information item, each page in the book being organized in a hierarchical structure including a plurality of hierarchical levels, each level of the hierarchical structure including metadata associated therewith; transmitting, with the circuitry, the generated electronic book unit to the external electronic apparatus;

when the electronic book is displayed by an external electronic apparatus and the information item including the first metadata is designated in the electronic book at the external electronic apparatus, transmitting, with the circuitry, the associated information associated with the first metadata to the external electronic apparatus; and performing, with the circuitry, a search for content based on metadata associated with each hierarchical level in item on a page when a user enters an indication that the user is interested in the page of the electronic book.

18. An electronic book displaying method, comprising:

storing, with circuitry, an electronic book unit including an electronic book obtained by digitizing a book having at least one page in which at least one information item is represented and first metadata added to the at least one information item, the at least one page being organized in a hierarchical structure including a plurality of hierarchical levels, each level of the hierarchical structure including metadata associated therewith;

displaying, with the circuitry, the electronic book unit;

detecting, with the circuitry, an operation of designating an information item of the electronic book, the operation being made by a user on the displayed electronic book unit;

receiving, with the circuitry, from a server apparatus, when the operation of designating the information item is detected, associated information that is associated with the designated information item, based on the first metadata added to the designated information item;

displaying, with the circuitry, the associated information associated with the designated information item; and performing, with the circuitry, a search for content based on metadata associated with each hierarchical level in a page when a user enters an indication that the user is interested in the page of the electronic book.

19. A non-transitory computer-readable storage medium storing computer-readable instructions thereon, which, when executed, cause a server apparatus capable of communicating with an external electronic apparatus to execute:

storing an electronic book obtained by digitizing a book having at least one page in which at least one information item is represented, and associated information that is associated with the at least one information item;

generating an electronic book unit by adding metadata to an information item of the stored electronic book, the first metadata associating the associated information with the information item, each page in the book being organized in a hierarchical structure including a plurality of hierarchical levels, each level of the hierarchical structure including metadata associated therewith;

transmitting the generated electronic book unit to the external electronic apparatus;

when the electronic book is displayed by the external electronic apparatus and the information item including the first metadata is designated in the electronic book at the external electronic apparatus, transmitting the associated information associated with the first metadata to the external electronic apparatus; and performing a search for content based on metadata associated with each hierarchical level in a page when a user enters an indication that the user is interested in the page of the electronic book.

20. A non-transitory computer-readable storage medium storing computer-readable instructions thereon, which, when executed, cause an electronic apparatus to execute:

storing an electronic book unit including an electronic book obtained by digitizing a book having at least one page in which at least one information item is represented and first metadata added to the at least one information item, the at least one page being organized in a hierarchical structure including a plurality of hierarchical levels, each level of the hierarchical structure including metadata associated therewith;
displaying the electronic book unit;
detecting an operation of designating an information item of the electronic book, the operation being made by a user on the displayed electronic book unit;
receiving from a server apparatus, when the operation of designating the information item is detected, associated information that is associated with the designated information item, based on the first metadata added to the designated information item;
displaying the associated information associated with the designated information item; and
performing a search for content based on metadata associated with each hierarchical level in a page when a user enters an indication that the user is interested in the page of the electronic book.

* * * * *